US012137371B2

(12) United States Patent
Nguyen et al.

(10) Patent No.: US 12,137,371 B2
(45) Date of Patent: Nov. 5, 2024

(54) ON-DEMAND RELAYING OF MESSAGES FOR SIDE-LINK COMMUNICATIONS

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Kapil Gulati, Hillsborough, NJ (US); Arjun Bharadwaj, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 16/817,448

(22) Filed: Mar. 12, 2020

(65) Prior Publication Data
US 2020/0322839 A1  Oct. 8, 2020

Related U.S. Application Data

(60) Provisional application No. 62/830,244, filed on Apr. 5, 2019.

(51) Int. Cl.
*H04W 28/04* (2009.01)
*H04W 4/06* (2009.01)
(Continued)

(52) U.S. Cl.
CPC ............ *H04W 28/04* (2013.01); *H04W 4/06* (2013.01); *H04W 84/18* (2013.01); *H04W 88/04* (2013.01)

(58) Field of Classification Search
CPC .............. H04L 1/1671; H04L 1/1861; H04L 2001/0097; H04L 1/0003; H04L 1/1812;
(Continued)

(56) References Cited

U.S. PATENT DOCUMENTS 10,327,273 B2 *  6/2019  Adachi ............... H04L 69/40
10,588,112 B2 *  3/2020  Lee .................... H04W 76/14
(Continued)

FOREIGN PATENT DOCUMENTS

WO  WO-2018031526 A1   2/2018
WO  WO-2019062555 A1 *  4/2019  ............... H04L 1/16

OTHER PUBLICATIONS

Partial International Search Report—PCT/US2020/022769—ISA/EPO—Jul. 6, 2020.
(Continued)

*Primary Examiner* — Syed Ali
*Assistant Examiner* — Kai Chang
(74) *Attorney, Agent, or Firm* — Holland & Hart LLP

(57) ABSTRACT

Methods, systems, and devices for wireless communications are described. In some systems (e.g., vehicle-to-everything (V2X) systems), a source user equipment (UE) may multicast a data packet to surrounding UEs. In some cases, a receiving UE may fail to receive the transmission due to blocking, shadowing, or interference. The receiving UE may multicast a message requesting retransmission of the packet. Any surrounding UEs that successfully received the data packet from the source UE and the relay request message from the receiving UE may determine whether to relay the packet. Determining whether to relay the packet may be based on a reference signal received power (RSRP) threshold, available resources, a distance to the blocked UE, or some combination thereof. In some examples, the receiving UE may successfully receive the relayed packet from the relay UE even if a path between the receiving UE and the original source UE is blocked.

45 Claims, 15 Drawing Sheets

(51) Int. Cl.
*H04W 84/18* (2009.01)
*H04W 88/04* (2009.01)

(58) Field of Classification Search
CPC ....... H04W 4/06; H04W 28/04; H04W 84/18; H04W 88/04; H04W 4/40; H04W 4/70; H04W 40/22
See application file for complete search history.

(56) References Cited

U.S. PATENT DOCUMENTS

| | | | |
|---|---|---|---|
| 2012/0140796 A1* | 6/2012 | Dai | H04L 1/0077 375/213 |
| 2015/0222393 A1* | 8/2015 | Gacanin | H04L 1/1854 714/748 |
| 2015/0296558 A1* | 10/2015 | Seo | H04W 72/21 370/338 |
| 2017/0019886 A1 | 1/2017 | Patel et al. | |
| 2017/0294955 A1* | 10/2017 | Tomioka | H04W 56/004 |
| 2018/0027429 A1* | 1/2018 | Li | H04W 24/02 455/426.1 |
| 2018/0027475 A1* | 1/2018 | Li | H04W 40/22 455/426.1 |
| 2018/0077748 A1* | 3/2018 | Kazmi | H04W 76/15 |
| 2018/0139724 A1* | 5/2018 | Loehr | H04W 72/02 |
| 2018/0206176 A1* | 7/2018 | Panteleev | H04W 76/14 |
| 2018/0213549 A1* | 7/2018 | Kim | H04W 72/1268 |
| 2018/0213577 A1* | 7/2018 | Burbidge | H04W 76/10 |
| 2019/0007827 A1* | 1/2019 | Huang | H04W 4/00 |
| 2019/0239112 A1* | 8/2019 | Rao | H04W 4/70 |
| 2019/0387429 A1* | 12/2019 | Basu Mallick | H04W 40/24 |
| 2019/0394700 A1* | 12/2019 | Lekutai | H04W 40/22 |
| 2020/0100167 A1* | 3/2020 | Cheng | H04W 4/40 |
| 2020/0136760 A1* | 4/2020 | Hahn | H04L 1/1621 |
| 2020/0145799 A1* | 5/2020 | Baghel | H04L 1/0018 |
| 2020/0145867 A1* | 5/2020 | Tseng | H04L 1/0026 |
| 2020/0145978 A1* | 5/2020 | Gulati | H04W 72/0406 |
| 2020/0275244 A1* | 8/2020 | Lee | G01S 13/876 |
| 2020/0314772 A1* | 10/2020 | Roth-Mandutz | H04W 4/90 |
| 2020/0351212 A1* | 11/2020 | Loehr | H04L 67/61 |
| 2021/0297199 A1* | 9/2021 | Miao | H04L 5/0048 |
| 2022/0117032 A1* | 4/2022 | Han | H04L 1/08 |
| 2022/0124678 A1* | 4/2022 | Lee | H04W 72/23 |

OTHER PUBLICATIONS

TCL Communication: "Resource allocation for NR sidelink Mode 2", 3GPP Draft, R1-1904807, sidelink Resource Allocation Mode, 3rd Generation Partnership Project (3GPP), Mobile Competence Centre, 650, Route Des Lucioles, F-06921 Sophia-Antipolis Cedex, France, vol. RAN WG1, No. Xi' An, China, Apr. 8, 2019-Apr. 12, 2019, Apr. 2, 2019 (Apr. 2, 2019), XP051707318, 4 pages. Retrieved from the Internet: URL: http://www.3gpp.org/ftp/tsg%5Fran/WG1%5FRL1/TSGR1%5F96b/Docs/R1%2D1904807%2Ezip. [retrieved on Apr. 2, 2019] p. 2, last par. p. 2, third "Agreements," item p. 3, first par. p. 3, section "Sensing procedure".

Huawei et al., "Sidelink Physical Layer Procedures for NR V2X", 3GPP Draft, R1-1903944, 3GPP TSG RAN WG1 Meeting #96bis, 3rd Generation Partnership Project (3GPP), Mobile Competence Centre, 650, Route Des Lucioles, F-06921 Sophia-Antipolis Cedex, France, vol. RAN WG1, No. Xi' An, China, Apr. 8, 2019-Apr. 12, 2019, Apr. 2, 2019 (Apr. 2, 2019), XP051707059, 17 pages, Retrieved from the Internet: URL:http://www.3gpp.org/ftp/tsg%5Fran/WG1%5FRL1/TSGR1%5F96b/Docs/R1%2D1903944%2Ezip [retrieved on Apr. 2, 2019], p. 6, par. below Proposal 5.

International Search Report and Written Opinion—PCT/US2020/022769—ISA/EPO—Oct. 23, 2020.

Xiaomi Communications: "On Physical Layer Procedures for V2x Communications", 3GPP Draft, R1-1901017, 3GPP TSG RAN WG1 Ad-Hoc Meeting 1901, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593862, 4 pages, Retrieved from the Internet: URL:http://www.3gpp.org/ftp/Meetings%5F3GPP%5FSYNC/RAN1/Docs/R1%2D1901017%2Ezip [retrieved on Jan. 20, 2019], p. 2, section 2.

Xiaomi Communications: "On Support of HARQ for V2x Communications", 3GPP Draft, 3GPP TSG RAN WG1 Meeting #94bis, R1-1811420, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051518824, 2 pages, Retrieved from the Internet: URL: http://www.3gpp.org/ftp/tsg%5Fran/WG1%5FRL1/TSGR1%5F94b/Docs/R1%2D1811420%2Ezip, [retrieved on Sep. 28, 2018], p. 1, Section 2.1, list item 1, last par, par. blw. Option 2.

\* cited by examiner

ON-DEMAND RELAYING OF MESSAGES FOR SIDE-LINK COMMUNICATIONS

CROSS REFERENCE

The present Application for Patent claims the benefit of U.S. Provisional Patent Application No. 62/830,244 by NGUYEN et al., entitled "ON-DEMAND RELAYING OF MESSAGES FOR SIDE-LINK COMMUNICATIONS," filed Apr. 5, 2019, assigned to the assignee hereof, and expressly incorporated herein.

INTRODUCTION

The following relates to wireless communications, and more specifically to relaying of messages for side-link communications, such as vehicle-to-everything (V2X) or device-to-device (D2D) communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method for wireless communications at a first UE is described. The method may include determining a failure of the first UE to receive a data packet from a second UE, transmitting a message indicating the failure of the first UE to receive the data packet, and receiving, from a third UE different from the second UE, the data packet based on the message indicating the failure of the first UE to receive the data packet.

An apparatus for wireless communications at a first UE is described. The apparatus may include a processor and memory coupled to the processor. The processor and memory may be configured to determine a failure of the first UE to receive a data packet from a second UE, transmit a message indicating the failure of the first UE to receive the data packet, and receive, from a third UE different from the second UE, the data packet based on the message indicating the failure of the first UE to receive the data packet.

Another apparatus for wireless communications at a first UE is described. The apparatus may include means for determining a failure of the first UE to receive a data packet from a second UE, transmitting a message indicating the failure of the first UE to receive the data packet, and receiving, from a third UE different from the second UE, the data packet based on the message indicating the failure of the first UE to receive the data packet.

A non-transitory computer-readable medium storing code for wireless communications at a first UE is described. The code may include instructions executable by a processor to determine a failure of the first UE to receive a data packet from a second UE, transmit a message indicating the failure of the first UE to receive the data packet, and receive, from a third UE different from the second UE, the data packet based on the message indicating the failure of the first UE to receive the data packet.

In some examples of the method, apparatuses, and non-transitory computer-readable medium described herein, determining the failure of the first UE to receive the data packet from the second UE may include operations, features, means, or instructions for receiving control information from the second UE, decoding the control information, and failing to decode the data packet in an indicated resource. In some cases, the decoded control information indicates the resource for transmission of the data packet.

Some examples of the method, apparatuses, and non-transitory computer-readable medium described herein may further include operations, features, means, or instructions for determining whether at least one further retransmission of the data packet is scheduled by the second UE based on the decoded control information.

Some examples of the method, apparatuses, and non-transitory computer-readable medium described herein may further include operations, features, means, or instructions for determining an absence of one or more further retransmissions of the data packet scheduled by the second UE. In some cases, the message indicating the failure of the first UE to receive the data packet may be transmitted based on determining the absence.

In some examples of the method, apparatuses, and non-transitory computer-readable medium described herein, the decoded control information may further indicate a second resource for retransmission of the data packet. Some examples of the method, apparatuses, and non-transitory computer-readable medium described herein may further include operations, features, means, or instructions for determining a failure to decode the data packet in the indicated second resource for retransmission and transmitting a second message indicating the failure to decode the data packet in the indicated second resource for retransmission.

Some examples of the method, apparatuses, and non-transitory computer-readable medium described herein may further include operations, features, means, or instructions for determining a cause of the failure of the first UE to receive the data packet. In some cases, the cause of the failure may be interference, a received signal energy of the transmission being weak (e.g., below a received signal energy threshold), or a combination thereof.

Some examples of the method, apparatuses, and non-transitory computer-readable medium described herein may further include operations, features, means, or instructions for determining whether to transmit the message indicating the failure of the first UE to receive the data packet to the second UE or the third UE or both based on the cause of the failure.

Some examples of the method, apparatuses, and non-transitory computer-readable medium described herein may further include operations, features, means, or instructions for determining an additional failure of the first UE to receive an additional data packet from the second UE. Some examples may further include operations, features, means, or instructions for determining that a cause of the additional failure of the first UE to receive the additional data packet is interference. Some examples may further include operations, features, means, or instructions for determining that at least one further retransmission of the additional data packet is scheduled by the second UE, and the at least one further retransmission may be dependent on a negative acknowledgment (NAK) message. Some examples may further include operations, features, means, or instructions for transmitting, to the second UE, a NAK message for the additional data packet based on the cause of the additional failure of the first UE to receive the additional data packet being interference. Some examples may further include operations, features, means, or instructions for receiving, from the second UE, a retransmission of the additional data packet based on the NAK message.

In some examples of the method, apparatuses, and non-transitory computer-readable medium described herein, the cause of the failure is the received signal energy of the transmission being weak, and the message indicating the failure of the first UE to receive the data packet may be transmitted to the third UE. In some cases, the transmission may be determined to be weak based on the transmission being below the received signal energy threshold.

Some examples of the method, apparatuses, and non-transitory computer-readable medium described herein may further include operations, features, means, or instructions for selecting one or more resources for a resource reservation. In some cases, the message indicating the failure of the first UE to receive the data packet includes the resource reservation. In some cases, the data packet may be received on the one or more resources indicated by the resource reservation.

In some examples of the method, apparatuses, and non-transitory computer-readable medium described herein, the message indicating the failure of the first UE to receive the data packet includes a source identifier (ID) indicating the second UE or a packet ID indicating the data packet or both.

In some examples of the method, apparatuses, and non-transitory computer-readable medium described herein, receiving the data packet may include operations, features, means, or instructions for receiving the data packet from the third UE based on the source ID or the packet ID or both.

In some examples of the method, apparatuses, and non-transitory computer-readable medium described herein, the message indicating the failure of the first UE to receive the data packet may include an exclusion range for a reserved resource, a modulation and coding scheme (MCS), a transmission mode, a redundancy version, a reference signal pattern, or a combination thereof. In some examples of the method, apparatuses, and non-transitory computer-readable medium described herein, receiving the data packet may include operations, features, means, or instructions for receiving the data packet from the third UE based on the exclusion range for the reserved resource, the MCS, the transmission mode, the RV, the reference signal pattern, or a combination thereof.

Some examples of the method, apparatuses, and non-transitory computer-readable medium described herein may further include operations, features, means, or instructions for receiving, from a fourth UE different from the second UE and the third UE, the data packet based on the message indicating the failure of the first UE to receive the data packet. Some examples may further include operations, features, means, or instructions for decoding the data packet based on combining information corresponding to receiving the data packet from the third UE and information corresponding to receiving the data packet from the fourth UE.

In some examples of the method, apparatuses, and non-transitory computer-readable medium described herein, the message indicating the failure of the first UE to receive the data packet includes a NAK message or a request for the data packet or both.

A method for wireless communications at a first UE is described. The method may include receiving a data packet from a second UE, receiving, from a third UE, a message indicating a failure of the third UE to receive the data packet, and relaying the data packet to the third UE based on the message indicating the failure of the third UE to receive the data packet.

An apparatus for wireless communications at a first UE is described. The apparatus may include a processor and memory coupled to the processor. The processor and memory may be configured to receive a data packet from a second UE, receive, from a third UE, a message indicating a failure of the third UE to receive the data packet, and relay the data packet to the third UE based on the message indicating the failure of the third UE to receive the data packet.

Another apparatus for wireless communications at a first UE is described. The apparatus may include means for receiving a data packet from a second UE, receiving, from a third UE, a message indicating a failure of the third UE to receive the data packet, and relaying the data packet to the third UE based on the message indicating the failure of the third UE to receive the data packet.

A non-transitory computer-readable medium storing code for wireless communications at a first UE is described. The code may include instructions executable by a processor to receive a data packet from a second UE, receive, from a third UE, a message indicating a failure of the third UE to receive the data packet, and relay the data packet to the third UE based on the message indicating the failure of the third UE to receive the data packet.

In some examples of the method, apparatuses, and non-transitory computer-readable medium described herein, the message indicating the failure of the third UE to receive the data packet includes a resource reservation. Some examples of the method, apparatuses, and non-transitory computer-readable medium described herein may further include operations, features, means, or instructions for determining one or more resources indicated by the resource reservation. Some examples may further include operations, features, means, or instructions for determining to relay the data packet to the third UE based on the first UE supporting transmitting on the one or more resources. In some cases, the data packet may be relayed to the third UE on the one or more resources indicated by the resource reservation.

Some examples of the method, apparatuses, and non-transitory computer-readable medium described herein may further include operations, features, means, or instructions for determining a reference signal received power (RSRP) for receiving the message indicating the failure of the third UE to receive the data packet. Some examples may further include operations, features, means, or instructions for determining to relay the data packet to the third UE based on the determined RSRP being greater than an RSRP threshold.

In some examples of the method, apparatuses, and non-transitory computer-readable medium described herein, the message indicating the failure of the third UE to receive the data packet may include operations, features, means, or instructions for determining the RSRP threshold based on the message indicating the failure of the third UE to receive the data packet.

Some examples of the method, apparatuses, and non-transitory computer-readable medium described herein may further include operations, features, means, or instructions for adjusting a power control parameter for relaying the data packet to the third UE based on the determined RSRP.

Some examples of the method, apparatuses, and non-transitory computer-readable medium described herein may further include operations, features, means, or instructions for receiving, from a fourth UE, a message indicating a failure of the fourth UE to receive an additional data packet. In some cases, the message indicating the failure of the fourth UE to receive the additional data packet includes a resource reservation. Some examples may further include operations, features, means, or instructions for determining to refrain from relaying the additional data packet to the fourth UE in one or more resources indicated by the resource reservation. Some examples may further include operations, features, means, or instructions for refraining from communicating on one or more resources that overlap with the one or more resources indicated by the resource reservation based on the resource reservation.

In some examples of the method, apparatuses, and non-transitory computer-readable medium described herein, the data packet may be received from the second UE according to a MCS, a spatial multiplexing scheme, and a demodulation reference signal pattern. In some cases, relaying the data packet to the third UE may include operations, features, means, or instructions for relaying the data packet to the third UE according to the MCS, the spatial multiplexing scheme, the demodulation reference signal pattern, or a combination thereof.

In some examples of the method, apparatuses, and non-transitory computer-readable medium described herein, the data packet may be received from the second UE according to a first MCS, a first spatial multiplexing scheme, and a first demodulation reference signal pattern. In some cases, relaying the data packet to the third UE may include operations, features, means, or instructions for relaying the data packet to the third UE according to a second MCS different from the first MCS, a second spatial multiplexing scheme different from the first spatial multiplexing scheme, a second demodulation reference signal pattern different from the first demodulation reference signal pattern, or a combination thereof.

In some examples of the method, apparatuses, and non-transitory computer-readable medium described herein, the message indicating the failure of the third UE to receive the data packet may include operations, features, means, or instructions for determining the second MCS, the second spatial multiplexing scheme, the second demodulation reference signal pattern, or a combination thereof based on the message indicating the failure of the third UE to receive the data packet.

Some examples of the method, apparatuses, and non-transitory computer-readable medium described herein may further include operations, features, means, or instructions for determining a distance between the first UE and the third UE, and determining to relay the data packet to the third UE based on the determined distance being less than a distance threshold.

In some examples of the method, apparatuses, and non-transitory computer-readable medium described herein, the message indicating the failure of the third UE to receive the data packet may include operations, features, means, or instructions for relaying the data packet to the third UE based on the source ID, the packet ID, the exclusion range for the reserved resource, the transmission mode, the RV, the reference signal pattern, or a combination thereof.

In some examples of the method, apparatuses, and non-transitory computer-readable medium described herein, the message indicating the failure of the third UE to receive the data packet includes a NAK message or a request for the data packet or both.

A method for wireless communications at a first UE is described. The method may include scheduling transmission of a data packet to a second UE and a third UE in one or more resources, transmitting, to the second UE and the third UE, control information including a resource reservation indicating the one or more resources and including an indication enabling the second UE to relay the data packet to the third UE in response to a message indicating a failure of the third UE to receive the data packet, and transmitting, to the second UE and the third UE, the data packet in the one or more resources.

An apparatus for wireless communications at a first UE is described. The apparatus may include a processor and memory coupled to the processor. The processor and memory may be configured to schedule transmission of a data packet to a second UE and a third UE in one or more resources, transmit, to the second UE and the third UE, control information including a resource reservation indicating the one or more resources and including an indication enabling the second UE to relay the data packet to the third UE in response to a message indicating a failure of the third UE to receive the data packet, and transmit, to the second UE and the third UE, the data packet in the one or more resources.

Another apparatus for wireless communications at a first UE is described. The apparatus may include means for scheduling transmission of a data packet to a second UE and a third UE in one or more resources, transmitting, to the second UE and the third UE, control information including a resource reservation indicating the one or more resources and including an indication enabling the second UE to relay the data packet to the third UE in response to a message indicating a failure of the third UE to receive the data packet, and transmitting, to the second UE and the third UE, the data packet in the one or more resources.

A non-transitory computer-readable medium storing code for wireless communications at a first UE is described. The code may include instructions executable by a processor to schedule transmission of a data packet to a second UE and a third UE in one or more resources, transmit, to the second UE and the third UE, control information including a resource reservation indicating the one or more resources and including an indication enabling the second UE to relay the data packet to the third UE in response to a message indicating a failure of the third UE to receive the data packet, and transmit, to the second UE and the third UE, the data packet in the one or more resources.

Some examples of the method, apparatuses, and non-transitory computer-readable medium described herein may further include operations, features, means, or instructions for receiving, from the second UE, the data packet based on the message indicating the failure of the third UE to receive the data packet.

DETAILED DESCRIPTION

Figure 1:
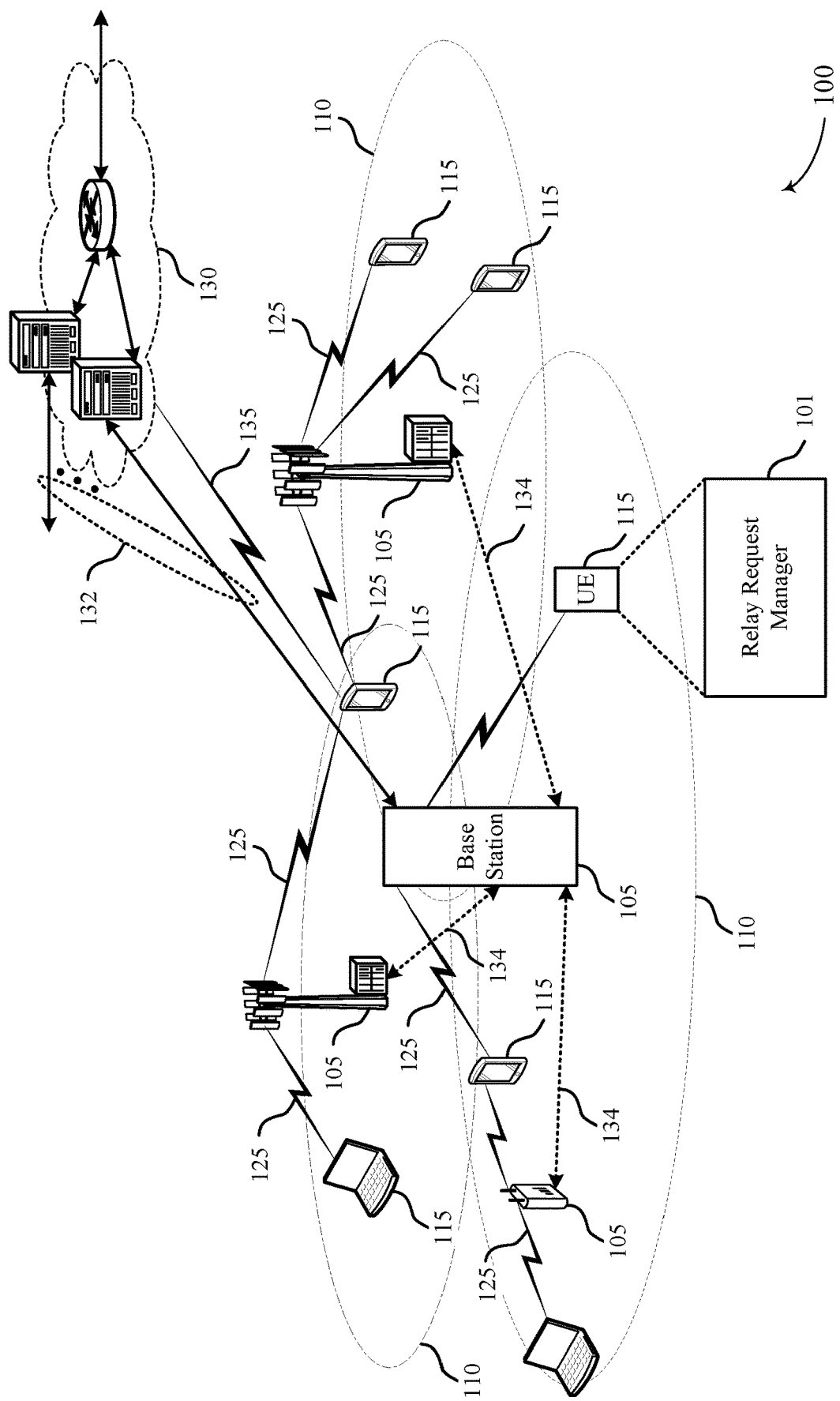
FIGS. 1 and 2 illustrate examples of wireless communications systems that support on-demand relaying of messages for side-link communications, in accordance with one or more aspects of the present disclosure.

In some wireless communications systems (e.g., V2X systems or D2D systems, among other examples), UEs may communicate with one another via side-link communications. In some examples, these UEs may be examples of vehicles in a V2X system. However, in some cases, certain effects—such as shadowing and blocking—may reduce the reliability of communications between the UEs. In cases of shadowing and blocking, the received signal power at a UE fluctuates due to an object's obstruction of the propagation path between the transmitter of the signal and the receiver. Both shadowing and blocking may be measured in decibels (dB). If shadowing is occurring, the path loss may be approximately 7 dB, while blocking may result in a path loss of approximately 10-15 dB. Shadowing may result from the receiving UE being located below an object that covers a large area (e.g., an object, such as a large building, may shadow a UE). Blocking may result from an object located in the direct path between the transmitting UE and the receiving UE (e.g., an object, such as a truck or other vehicle, may block a UE). In some cases, multi-blockers (e.g., more than one blocker or obstruction) may exist between the transmitter and receiver and may cause around 30 dB of path loss. Both shadowing and blocking may result in strong signal attenuation.

Blocking, shadowing, or a combination thereof may cause enough signal attenuation such that a receiver may be unable to receive a packet from a source transmitter. In some cases, the source transmitter may retransmit the packet; however, this retransmission may continue to be impacted by blocking or shadowing. The number of repetitions and increased transmit power needed for the receiver to successfully receive the packet (i.e., to overcome the blocking, shadowing, or both) may use an over-provisioning of resources and result in significant latency in the system. In some cases, multiple retransmissions of the packet with increased transmit power may cause signal collisions and interference at other UEs. Interference and latency due to blocking and shadowing may cause performance degradation in the wireless communications system.

In some wireless communications systems (e.g., systems supporting V2X communications, D2D communications, or both), UEs may communicate over side-link communication channels using techniques to mitigate the effects of blocking/shadowing. These UEs may be examples or components of vehicles or other wireless devices, and the side-link communications may be referred to as V2X, vehicle-to-vehicle (V2V), or D2D communications. In some cases, the communications may involve a transmitting UE multicasting a packet, where one or more receiving UEs within a target range can monitor for and receive the packet. However, in some examples, packet reception at the target range may fail for one or more UEs due to shadowing, blockage, or a combination thereof. It should be understood that blocking and shadowing may be used interchangeably herein, and any descriptions referring to blocking may also apply to shadowing (and vice versa).

If a receiving UE identifies that it failed to receive a transmitted packet (e.g., due to blocking or shadowing), the receiving UE may transmit a signal requesting retransmission of the missed packet (e.g., using a NAK message). The request may indicate that the receiving UE failed to receive the packet and that further retransmissions of the packet should be sent. In some cases, the transmitting UE may not receive the request due to shadowing, blocking, or a combination thereof. In other cases, the transmitting UE may receive the request, but the performance gain achieved by the transmitting UE retransmitting the packet may be limited if the retransmission to the receiving UE continues to be shadowed, blocked, or both. Furthermore, if the number of resources or the transmit power or both for the retransmission are significantly increased in order to reach the receiving UE, the retransmission may cause collisions with other signals and interference with other UEs throughout the network, degrading performance in the network.

To increase reliability of the receiving UE successfully receiving the packet, the receiving UE may multicast the request for packet retransmission. One or more other UEs (e.g., instead of or in addition to the transmitting UE) may receive the request for retransmission. In some cases, at least one of these UEs may have successfully received the packet during the multicast transmission from the transmitting UE (e.g., if this UE is not blocked or shadowed). Any UE that successfully received the packet and receives the request for retransmission may determine whether to relay the packet to the receiving UE that failed to receive the packet. For example, a UE may determine to relay the packet to the receiving UE based on a link quality with the receiving UE or a distance to the receiving UE or both. The relay UE may relay the packet to the receiving UE based on the request for retransmission. In some cases, the signal path from the relay UE to the receiving UE may not be blocked or shadowed (e.g., even if the signal path from the transmitting UE to the receiving UE is blocked, shadowed, or both). As such, relaying the packet may increase the probability of successful packet reception at the receiving UE.

Aspects of the disclosure are initially described in the context of wireless communications systems. Specific examples are then described for on-demand relaying of messages in side-link (e.g., V2X, D2D, V2V, etc.) communications systems. Aspects of the disclosure are further illustrated by and described with reference to apparatus diagrams, system diagrams, and flowcharts that relate to on-demand relaying of messages for side-link communications.

FIG. 1 illustrates an example of a wireless communications system 100 that supports on-demand relaying of messages for side-link communications, in accordance with one or more aspects of the present disclosure. The wireless communications system 100 includes base stations 105, UEs 115, and a core network 130. In some examples, the wireless communications system 100 may be an LTE network, an LTE-A network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as in the range of 300 megahertz (MHz) to 300 gigahertz (GHz). The region from 300 MHz to 3 GHz may be known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as $T_f$=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, side-link communications (e.g., V2X communications, D2D communications, or any other side-link communications) may be used to support messaging between UEs 115. In some cases, a UE 115 (e.g., a vehicle) may transmit a data packet to surrounding UEs 115 via a multicast transmission. However, an object (e.g., a UE 115, another device, an object in nature, or any other object) may obstruct such signals from reaching an intended receiver. Therefore, a portion of the receiving UEs 115 may fail to receive a data packet in side-link transmissions due to interference, blocking, shadowing, or a combination thereof. Specifically, one UE 115 may not receive the packet due to blocking while other UEs 115 in the area might receive the packet.

The blocked UE 115 may determine that it is unable to receive the packet from the source UE 115 and may transmit a request in a multicast transmission such that neighboring UEs 115 may receive the request. The request may instruct the neighboring UE 115 to transmit the packet to the blocked UE 115. The relay request manager 101 (e.g., an example or component of a communications manager as described with reference to FIGS. 4 through 7) may handle the request. Neighboring UEs 115 may receive the request, determine if they have received the desired packet, and determine whether to relay the packet. For example, a UE 115 may determine to act as a relay UE 115 if the UE 115 is close enough to the blocked UE 115 based on location information of the two UEs 115, if the UE 115 has a strong enough link quality with the blocked UE 115 based on the RSRP of the request, or some combination thereof. The UE 115 that has previously received the data packet from the source UE 115 and determines itself to be a valid relay UE for the blocked UE 115 may transmit (i.e., relay) the packet to the blocked UE 115 based on the request. Depending on the positioning of the UEs 115 and the obstruction(s) in the system, while transmissions may be blocked from the original source UE 115 to the blocked UE 115, transmissions may be successful from the relay UE 115 to the blocked UE 115.

Figure 2:
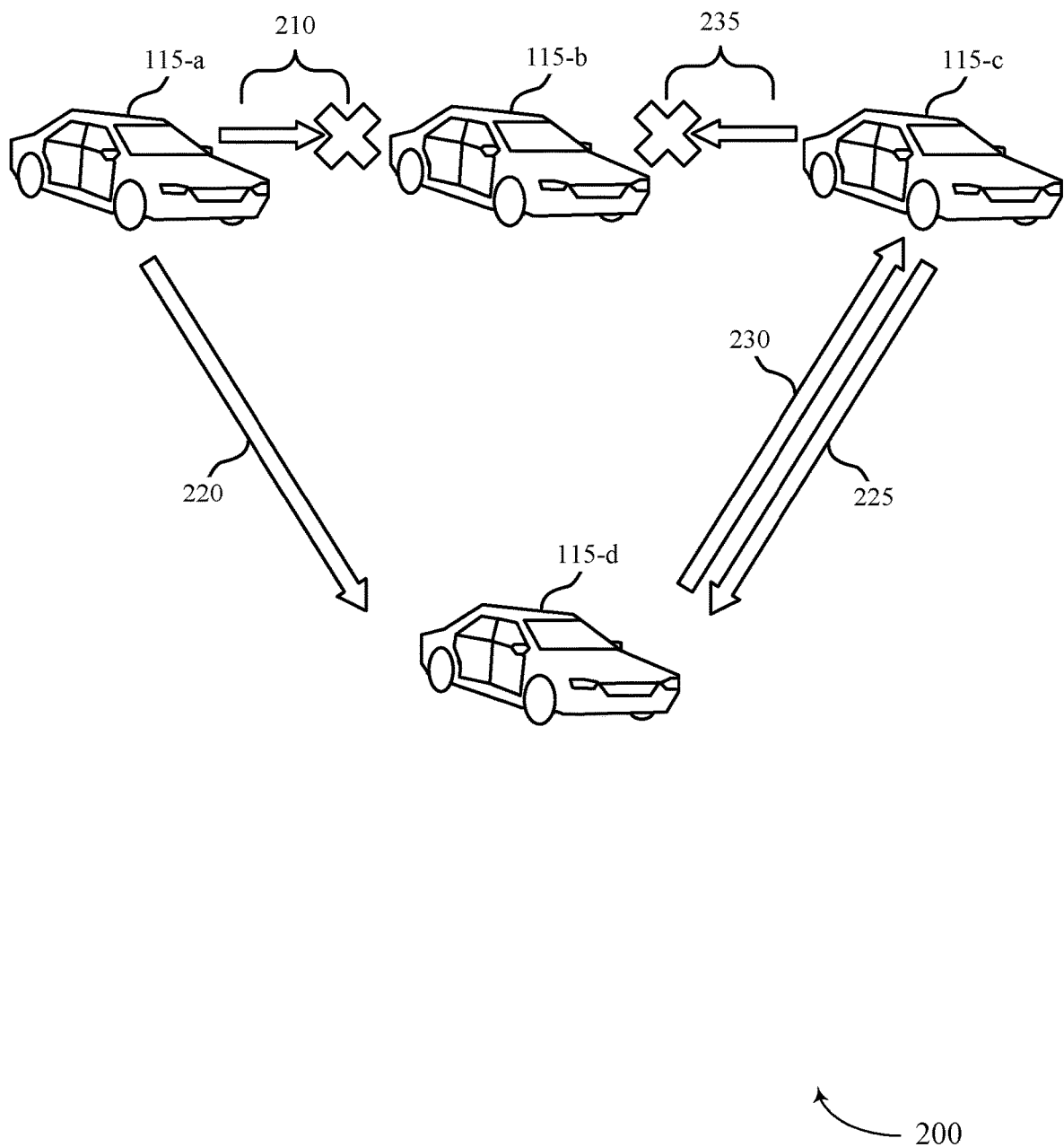

FIG. 2 illustrates an example of a wireless communications system 200 that supports on-demand relaying of messages for side-link communications, in accordance with one or more aspects of the present disclosure. In some examples, wireless communications system 200 may implement aspects of wireless communications system 100. The wireless communications system 200 may include UEs 115-a, 115-b, 115-c, and 115-d, which may be examples of UEs 115 as described with reference to FIG. 1. In some cases, UEs 115 may be examples of vehicles in a V2X system. In other cases, UEs 115 may be examples of wireless devices in a D2D system. In some examples, UE 115-c may implement an on-demand procedure for requesting a blocked data packet. For example, UE 115-a may transmit a request to relay UE 115-d via side-link 225, and UE 115-d may relay a packet to UE 115-c on demand based on the request. Additionally or alternatively, other wireless devices, such as UEs 115-a, 115-b, or some combination of these UEs 115 may implement on-demand relaying of a requested data packet due to blocking.

In side-link communications, data packets may be transmitted via multicast transmissions such that a source UE 115-a may transmit a packet and multiple UEs in a target range (such as UEs 115-b, 115-c, 115-d, etc.) may monitor for the data packet. The packet reception at the target range may fail for one or more UEs 115 due to shadowing, blocking, interference, or a combination thereof. The packet may, however, be received at other UEs 115 that were not blocked, shadowed, or experiencing significant interference.

For example, source UE 115-a may transmit a packet via side-links 210 and 220 in a multicast transmission. However, in some cases, the transmission to a receiving UE 115-c (e.g., on side-link 210) may be blocked by some obstruction, such as a UE 115-b or some other device, structure, etc. In these cases, the transmitted packet may be unable to reach the intended receiver at UE 115-c on side-link 210 with a sufficient signal strength for UE 115-c to successfully receive and decode the packet. In some cases, UE 115-d may successfully receive the packet in the multicast transmission from source UE 115-a via side-link 220 (e.g., due to the positioning of the obstruction(s) in the system).

Packet reception failure in the system may be due to interference or due to blocking/shadowing. In some cases, the source UE 115-a, the receiving UE 115-c, or both may identify when packet reception failure occurs. The transmitting UE 115-a may transmit a control message including control information that indicates resources for transmission of the data packet. If the receiving UE 115-c is able to decode the control message or channel, but is unable to receive and decode the data packet in the indicated resources, the receiving UE 115-c may determine that the receiving UE 115-c missed a transmitted packet.

In some examples, the source UE 115-a, the receiving UE 115-c, or both may determine a cause of the packet reception failure. For example, if the UE 115-c is able to decode control information but not data, the UE 115-c may determine if the decoding failure for the data packet is due to interference. In one case, a path between the transmitter (e.g., at source UE 115-a) and the UE 115-c may be unobstructed but the data may be interference limited. This may be determined if the UE 115-c is able to decode multiple (e.g., two) control messages corresponding to multiple (e.g., two) overlapping data transmissions by different transmitters that are too close to one another (and interfere with each other). In another case, if data packet decoding fails and an RSRP or reference signal received quality (RSRQ) measurement of link quality is higher than a certain threshold, then the UE 115-c may determine that the packet decode failure is due to interference. In these cases, the transmitter may retransmit the data packet at a later time when there may be reduced interference. In other cases, packet decode failure may be due to blocking, shadowing, or a combination thereof. For example, UE 115-c may determine that packet decoding failure is due to blocking/shadowing if the UE 115-c does not determine the failure is due to interference. In some cases, UE 115-c may analyze the expected cause of decoding failure. In other cases, UE 115-c may not perform this analysis.

If the receiving UE 115-c measures a weak RSRP or RSRQ or both, the receiving UE 115-c may determine that the packet reception failed due to a weak link between the UE 115-c and the transmitter (e.g., UE 115-a). In some cases, the weak link may be caused by blocking or shadowing. If the remaining delay budget for the packet is low (e.g., below a delay budget threshold), the receiving UE 115-c may transmit a NAK message to the transmitting UE 115-a that may include a request for retransmission of the data packet. The delay budget specifies an allowed amount of time for the data packet to be delayed between scheduled transmission and reception. In some cases, the receiving UE 115-c may determine that the transmitter has scheduled one or more retransmissions of the packet (e.g., based on a bit or field in the decoded control information reserving the resources for a next transmission), and the receiving UE 115-c may monitor for the packet in the resources scheduled for retransmission.

If the source UE 115-*a* has no further scheduled retransmissions of the packet, the source UE 115-*a* may indicate its last transmission of the packet (e.g., using the bit or field in the control information). In some cases, this transmission via side-link 210 may still be blocked from successfully reaching UE 115-*c*. If UE 115-*c* fails to receive the packet, the blocked UE 115-*c* may transmit a signal to request the packet. In some cases, UE 115-*c* may transmit the request if no more retransmissions of the packet are scheduled, if the remaining delay budget for the packet allows (e.g., is above a certain threshold), or if some combination of these conditions are met. The signal requesting the packet may be transmitted via a multicast or unicast transmission. Blocked UE 115-*c* may transmit the request and UE 115-*d* may receive the request via side-link 225. In some cases, the request may be blocked from reaching source UE 115-*a* (e.g., due to obstructing UE 115-*b*) via side-link 235. In other cases, UE 115-*a* may also receive the request if there is no longer an obstruction between UE 115-*c* and UE 115-*a*.

The request may contain a source ID of the source UE 115-*a*, a packet ID of the requested data packet, an RSRP threshold for determining if a link quality is strong enough for relaying the packet, a reserved resource on which to send the relayed packet, any required exclusion range for the reserved resource, an MCS, a transmission mode, an RV for the relay transmission of the data packet, a reference signal pattern, or some combination of these parameters. The parameters in the request may indicate how a relay UE 115 may relay the packet, such that multiple relay UEs 115 may have similar transmissions (e.g., using the same or similar transmit parameters). The request may additionally reserve the resources indicated in the request, such that other UEs 115 receiving the request, but not acting as relays, may refrain from transmitting on these resources to avoid interference with the relayed packet.

A UE 115 that receives the packet from the source UE 115-*a*, such as UE 115-*d*, may receive the request from the blocked UE 115-*c*. In some cases, the UE 115-*d* may determine whether to act as a relay for blocked UE 115-*c* based on one or more parameters. For example, the source UE 115-*a* may transmit a message to one or more UEs 115 (e.g., UEs 115-*b*, 115-*c*, and 115-*d*) that indicates that the UEs 115 may determine whether to act as relays for a blocked UE 115 (e.g., UE 115-*c*). This indication—which may be an example of a parameter from which a UE 115 may determine whether to act as a relay—may be a bit indicator in a control message scheduling a data packet. One value of the bit indicator (e.g., a bit value of one) may enable a UE 115 to relay the data packet to another UE 115 if the other UE 115 misses the data packet. Another bit value (e.g., a bit value of zero) or an absence of the bit indicator may cause a UE 115 to refrain from relaying the data packet, even if another UE 115 misses the data packet. Additionally or alternatively, the one or more parameters may involve UE 115-*d* relaying the packet if UE 115-*d* is close enough to the blocked UE 115-*c* based on location information for the two UEs 115, if UE 115-*d* has a strong enough link quality with UE 115-*c* (e.g., determined by comparing a current RSRP of the request from UE 115-*c* to an RSRP threshold that may be configured or dynamically indicated in the request), or if a combination of these conditions are met. If the UE 115-*d* determines to act as a relay UE 115-*d* (e.g., if this type of relaying is enabled at UE 115-*d*, UE 115-*d* determines it is near enough to the blocked UE 115-*c*, is not blocked from the UE 115-*c* based on a strong enough link quality with UE 115-*c*, has the indicated resources available for transmission, etc.), then the relay UE 115-*d* may transmit the packet (e.g., via side-link 230) on the resources indicated in the request to the blocked UE 115-*c*. In this way, the wireless communications system 200 may implement on-demand relaying of data packets between UEs to mitigate blocking in the system.

In some cases, obstructing UE 115-*b* may additionally or alternatively act as a relay UE (e.g., if UE 115-*b* meets the RSRP requirement, can transmit on the reserved resource, and has received the appropriate packet). In some cases, UE 115-*b* and UE 115-*d* may both be potential relay UEs. In these cases, UE 115-*b* and UE 115-*d* may both relay the data packet to UE 115-*c*. Due to both UEs 115 receiving the indicated information in the request from UE 115-*c*, the UEs 115 may relay the data packet using the same transmission parameters. Upon receiving both data packets, UE 115-*c* may combine the transmissions and decode the data packet. The complexity of combining the transmissions may be reduced based on the common transmission parameters used by the relay UEs 115. In some cases, UE 115-*c* may set one or more thresholds for relaying the packet to limit the number of valid relay UEs 115 in the system.

In some cases, the packet may be relayed with a high MCS (e.g., a higher MCS than the original packet transmission from the source UE 115-*a*). Additionally or alternatively, MIMO may be used to reduce the resource usage at the blocked UE 115. In some cases, power control may be implemented by a relay UE 115-*d* such that the transmit power supports reception of the packet at the blocked UE 115-*c*, but does not support reception much beyond the blocked UE 115-*c*. By implementing power control, interference with other UEs 115 (e.g., other receiving UEs 115 not shown) may be mitigated, which may improve overall network performance.

It is to be understood that the processes described with reference to wireless communications system 200 may apply to V2X systems, D2D systems, or any other types of systems supporting side-link communications between devices. Additionally, the communications described may be examples of unicast, broadcast, and/or multicast signaling.

Figure 3:
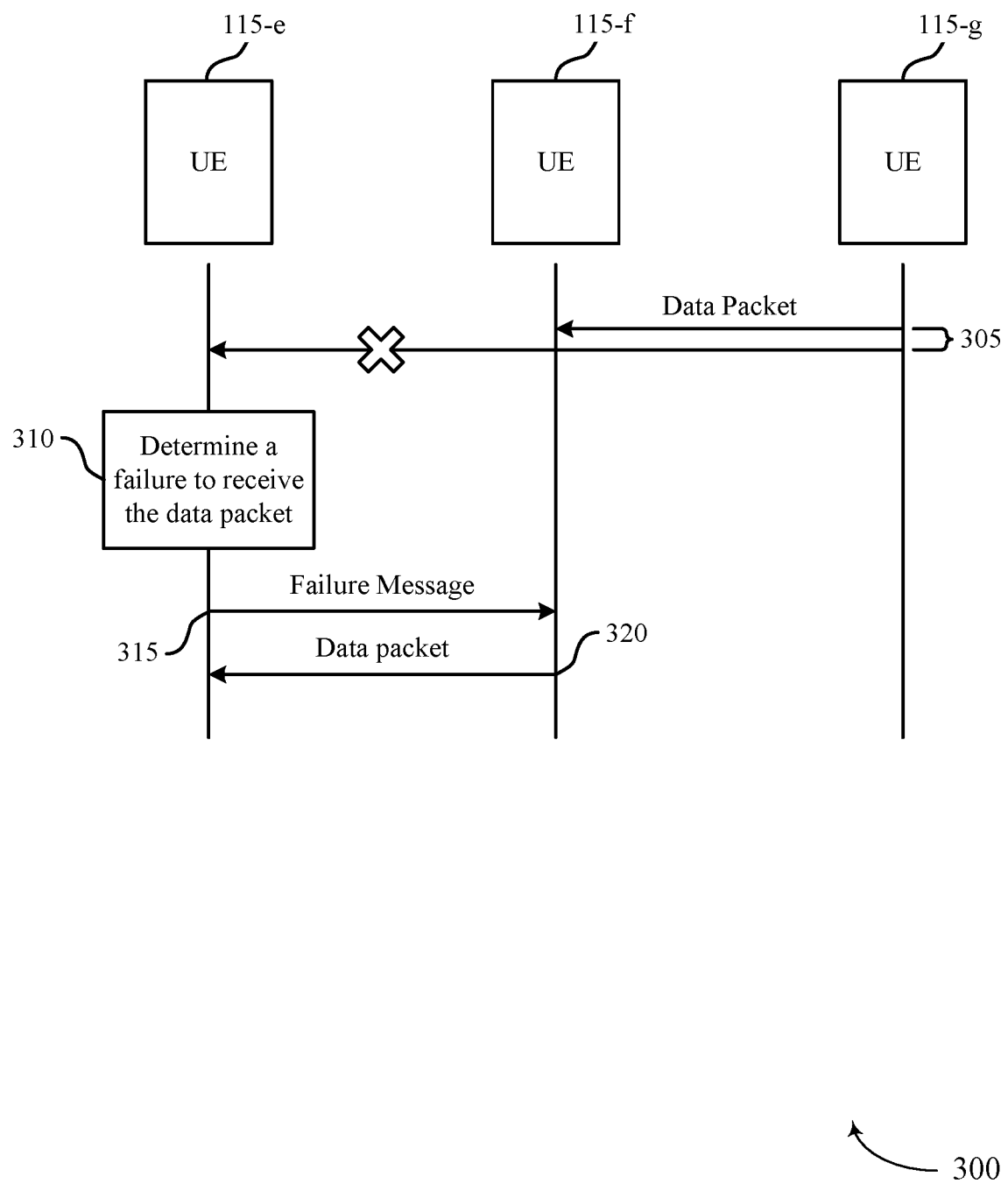
FIG. 3 illustrates an example of a process flow that supports on-demand relaying of messages for side-link communications, in accordance with one or more aspects of the present disclosure.

FIG. 3 illustrates an example of a process flow 300 that supports on-demand relaying of messages for side-link communications, in accordance with one or more aspects of the present disclosure. The process flow 300 may illustrate an example on-demand relaying scheme to provide a UE 115 with a missed data packet. In some examples, process flow 300 may implement aspects of wireless communications systems 100 and 200. For example, UE 115-*e* may request a blocked data packet from UE 115-*f*, where UE 115-*f* successfully received the data packet from UE 115-*g*. UEs 115-*e*, 115-*f*, and 115-*g* may be examples of the corresponding wireless devices described with reference to FIGS. 1 and 2. For example, UEs 115-*e*, 115-*f*, and 115-*g* may be examples of vehicles in a V2X system, wireless devices in a D2D system, or any other types of UEs 115 operating using side-link communications. Alternative examples of the following may be implemented, where some operations are performed in a different order than described or are not performed at all. In some cases, operations may include additional features not mentioned below, or further operations may be added.

At 305, UE 115-*g* (e.g., a source or transmitting UE 115) may transmit a signal that may include a data packet (e.g., in a V2X transmission). The transmission may be multicast or unicast and the data packet may be intended for reception at UE 115-*e*, UE 115-*f*, or both. However, the data packet may not be received by UE 115-*e*. This may be due to interference, blocking, shadowing, or a combination thereof. However, UE 115-*f* may successfully receive the data packet from UE 115-*g*.

At 310, UE 115-*e* (e.g., a blocked or receiving UE 115) may determine a failure to receive the data packet from UE 115-*g*. In some cases, the failure to receive the data packet may occur when the remaining delay budget for the packet is low (e.g., below some threshold) and the receiving UE 115-*e* may be unable to wait for a next retransmission from the source UE 115-*g*. The failure may be determined based on UE 115-*e* receiving control information from UE 115-*g* that indicates resources for transmission of the data packet, but UE 115-*e* fails to decode the data packet in the indicated resources. Receiving UE 115-*e* may also determine whether there are future retransmissions scheduled based on the information indicated in the decoded control.

At 315, UE 115-*e* may transmit a message indicating the failure to receive the data packet to UE 115-*f*, UE 115-*g*, or other UEs 115 that may have received the data packet from the source UE 115-*g*. In some cases, the failure message may be transmitted based on UE 115-*e* determining that no future retransmissions of the data packet are scheduled according to the control information (e.g., there is an absence of one or more scheduled further retransmissions). This message may be transmitted via unicast signaling to a UE 115 that is known or expected not to be blocked or via multicast signaling to any surrounding UEs 115 (e.g., within a target range). The failure message may include a resource reservation so that the data packet may be received on the indicated reserved resources. In some cases, the failure message may include a source ID indicating UE 115-*g* or a packet ID indicating the data packet or both. In some cases, the failure message may include an exclusion parameter, such as an exclusion range (e.g., RSRP, distance), for one or more reserved resources. In some cases, the failure message may include an MCS index, a transmission mode, an RV, a reference signal pattern, an RSRP threshold, or a combination thereof. UE 115-*f* may receive the request and determine whether to relay the data packet to UE 115-*e*. For example, UE 115-*f* may determine if UE 115-*f* is close enough to UE 115-*e* based on location information for the two UEs. Additionally or alternatively, UE 115-*f* may determine if UE 115-*f* has a strong enough link quality with UE 115-*e* based on the RSRP for receiving the failure message at 315. In some cases, UE 115-*f* may determine to relay the data packet to UE 115-*e* based on the identified RSRP being greater than an RSRP threshold, the identified distance being less than a distance threshold, UE 115-*f* supporting transmitting in the indicated resources, or a combination thereof.

At 320, UE 115-*f* (e.g., a relay UE 115) may relay the data packet to UE 115-*e* based on the failure message (e.g., if UE 115-*f* meets the RSRP threshold, supports transmitting in the one or more reserved resources indicated by the resource reservation in the failure message, successfully received the data packet, etc.). The packet may be relayed by UE 115-*f* to UE 115-*e* on the one or more reserved resources. In some cases, UE 115-*f* may adjust a power control parameter for relaying the data packet based on the RSRP for receiving the failure message. UE 115-*f* may select transmit parameters for relaying the data packet based on the parameters indicated in the failure message (i.e., the request for the packet). In some cases, UE 115-*e* may successfully receive the relayed data packet from UE 115-*f* on the one or more reserved resources at 320.

Figure 4:
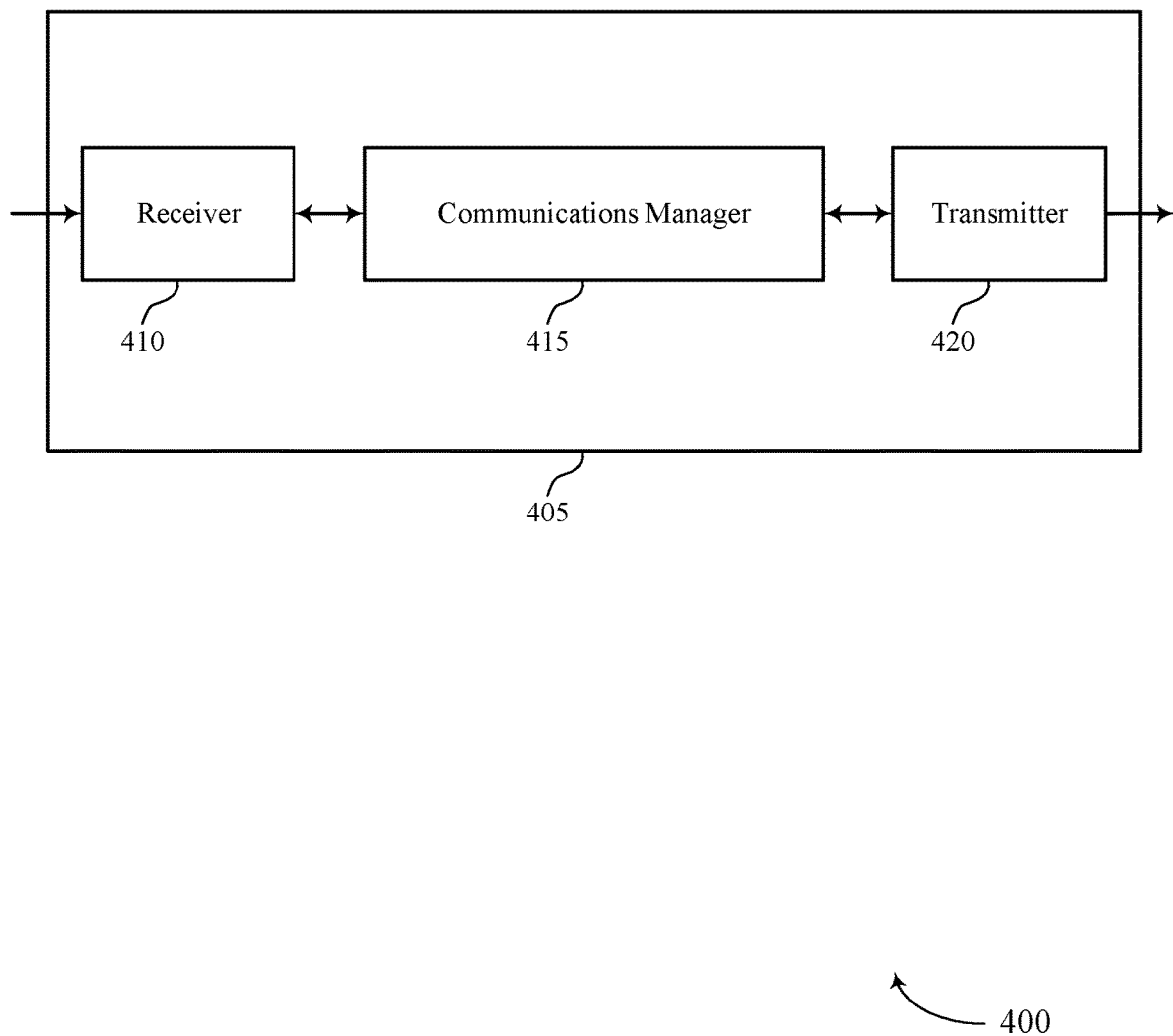
FIGS. 4 and 5 show block diagrams of devices that support on-demand relaying of messages for side-link communications, in accordance with one or more aspects of the present disclosure.

FIG. 4 shows a block diagram 400 of a device 405 that supports on-demand relaying of messages for side-link communications, in accordance with one or more aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to on-demand relaying of messages for side-link communications). Information may be passed on to other components of the device 405. The receiver 410 may be an example of aspects of the transceiver 720 described with reference to FIG. 7. The receiver 410 may utilize a single antenna or a set of antennas.

The communications manager 415 may be implemented at a first UE. In some cases, the communications manager 415 may determine a failure of the first UE to receive a data packet from a second UE (e.g., in a side-link transmission, such as a V2X or D2D transmission), transmit a message indicating the failure of the first UE to receive the data packet, and receive, from a third UE different from the second UE, the data packet based on the message indicating the failure of the first UE to receive the data packet. Additionally or alternatively, the communications manager 415 may receive a data packet from a second UE, receive, from a third UE, a message indicating a failure of the third UE to receive the data packet, and relay the data packet to the third UE based on the message indicating the failure of the third UE to receive the data packet. Additionally or alternatively, the communications manager 415 may schedule transmission of a data packet to a second UE and a third UE in one or more resources, transmit, to the second UE and the third UE, control information including a resource reservation indicating the one or more resources and including an indication enabling the second UE to relay the data packet to the third UE in response to a message indicating a failure of the third UE to receive the data packet, and transmit, to the second UE and the third UE, the data packet in the one or more resources. The communications manager 415 may be an example of aspects of the communications manager 710 described herein.

The actions performed by the communications manager 415 as described herein may be implemented to realize one or more potential improvements in side-link messaging latency, overhead, or both. For example, relaying a data packet to a UE 115 that missed the data packet may improve the latency involved in the UE 115 receiving the missed data packet. Furthermore, the relaying may allow UEs 115 communicating over side-links to avoid potential blocking/shadowing, improving the reliability of data packet retransmissions. Improved reliability of the data packet retransmissions (e.g., when the data packet is relayed by a second UE 115, rather than retransmitted by a first UE 115 to avoid a potential obstruction) may reduce the overhead on the side-link channel.

Based on a first UE 115 receiving a missed data packet from a third UE 115 (e.g., different from a second UE 115 that originally transmitted the data packet), a processor of the first UE 115 (e.g., a processor controlling the receiver 410, the communications manager 415, the transmitter 420, etc.) may reduce processing resources used for side-link communications at the first UE 115, the second UE 115, the third UE 115, or some combination thereof. For example, by receiving a relayed data packet, the first UE 115 may reduce a number of times the first UE 115 requests a retransmission of the data packet. Reducing the number of retransmission requests may reduce a number of times the processor ramps up processing power and turns on processing units to monitor for retransmissions. Additionally or alternatively, the second UE 115 may reduce a number of retransmissions performed for a data packet (e.g., as the third UE 115 may successfully relay the data packet to avoid potential blocking of the data packet) in order for the first UE 115 to successfully receive the data packet. Reducing the number of data packet retransmissions may reduce a number of times the processor ramps up processing power and turns on processing units to perform the retransmissions.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
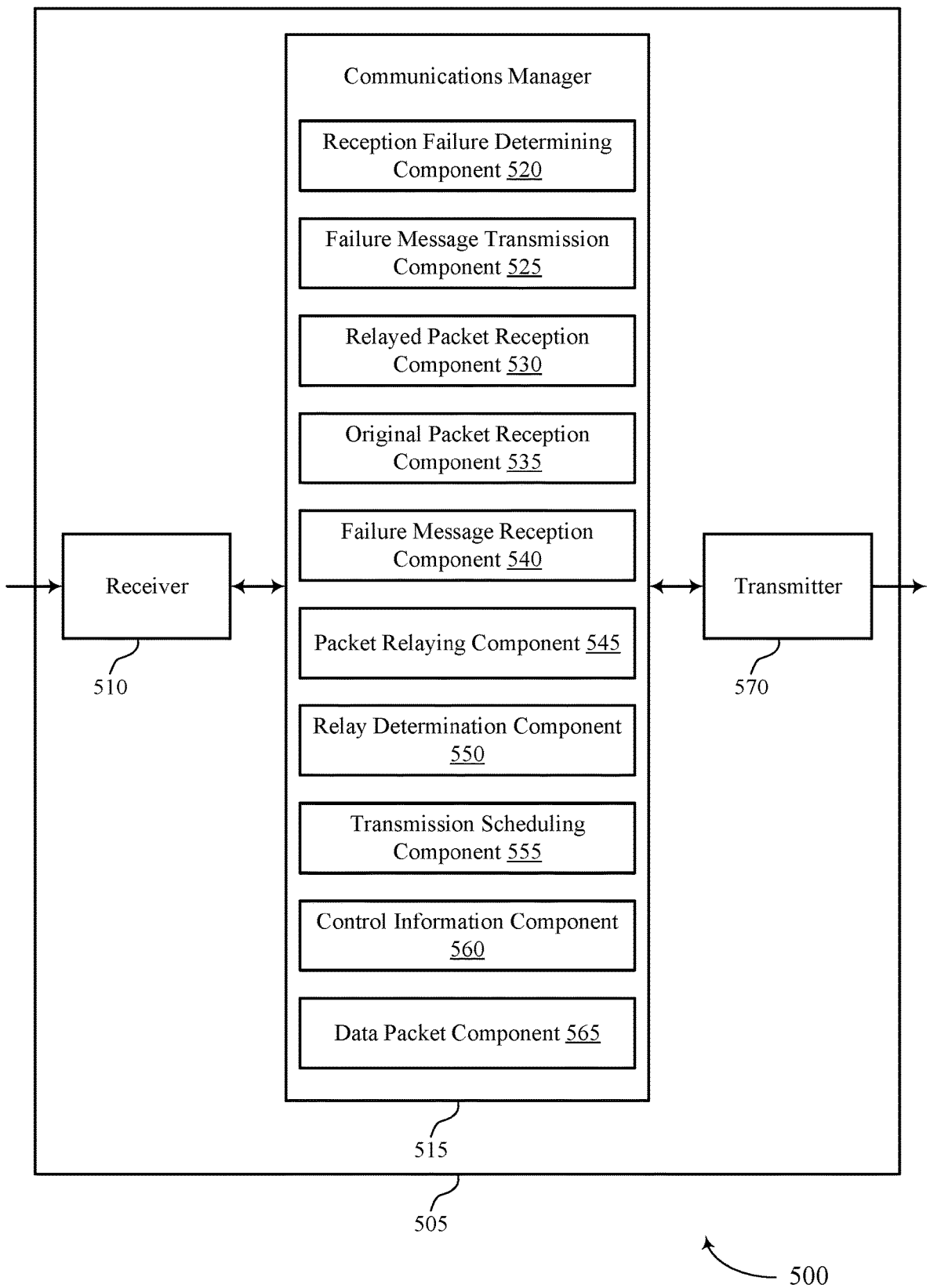

FIG. 5 shows a block diagram 500 of a device 505 that supports on-demand relaying of messages for side-link communications, in accordance with one or more aspects of the present disclosure. The device 505 may be an example of aspects of a device 405 or a UE 115 as described herein. The device 505 may include a receiver 510, a communications manager 515, and a transmitter 570. The device 505 may also include a processor. Each of these components may be in communication with one another (e.g., via one or more buses).

The receiver 510 may receive information such as packets, user data, or control information associated with various information channels (e.g., control channels, data channels, and information related to on-demand relaying of messages for side-link communications). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a reception failure determining component 520, a failure message transmission component 525, a relayed packet reception component 530, an original packet reception component 535, a failure message reception component 540, a packet relaying component 545, a relay determination component 550, a transmission scheduling component 555, a control information component 560, a data packet component 565, or some combination of these components. The communications manager 515 may be an example of aspects of the communications manager 710 described herein. The communications manager 515 may be implemented by a first UE.

The reception failure determining component 520 may determine a failure of the first UE to receive a data packet from a second UE. The failure message transmission component 525 may transmit a message indicating the failure of the first UE to receive the data packet. The relayed packet reception component 530 may receive, from a third UE different from the second UE, the data packet based on the message indicating the failure of the first UE to receive the data packet. In some cases, the operations performed by the reception failure determining component 520, the relayed packet reception component 530, or both may be performed by the receiver 510 or a transceiver 720. Additionally or alternatively, the operations performed by the failure message transmission component 525 may be performed by the transmitter 570 or the transceiver 720.

The original packet reception component 535 may receive a data packet from a second UE. The failure message reception component 540 may receive, from a third UE, a message indicating a failure of the third UE to receive the data packet. The packet relaying component 545 may relay the data packet to the third UE based on the message indicating the failure of the third UE to receive the data packet. In some cases, the operations performed by the original packet reception component 535, the failure message reception component 540, or both may be performed by the receiver 510 or a transceiver 720. Additionally or alternatively, the operations performed by the packet relaying component 545 may be performed by the transmitter 570 or the transceiver 720.

The relay determination component 550 may additionally handle conflicts between relaying information, transmitting original information, receiving information, or some combination of these (e.g., for some types of wireless devices, such as half-duplex devices). For example, the relay determination component 550 may determine multiple messages indicating failures to receive different data packets and may determine the resources for relaying the different data packets overlap (e.g., overlap in time). The relay determination component 550 may determine which data packet to relay based on priority values for the data packets or a random selection procedure. Similarly, if the device 505 determines a packet to relay on demand, and determines that the resources for relaying the packet overlap (e.g., overlap in time) with resources scheduled for receiving a transmission at the device 505 or transmitting an original transmission by the device 505, the relay determination component 550 may determine whether to relay the packet or receive the transmission or transmit the original packet based on one or more conflict handling rules. For example, the relay determination component 550 may determine how to operate in the overlapping resources based on priority values for the data packets, priority values for the relaying, transmitting, and/or receiving operations, a random selection procedure, or some combination of these criteria.

The transmission scheduling component 555 may schedule transmission of a data packet to a second UE and a third UE in one or more resources. The control information component 560 may transmit, to the second UE and the third UE, control information including a resource reservation indicating the one or more resources and including an indication enabling the second UE to relay the data packet to the third UE in response to a message indicating a failure of the third UE to receive the data packet. The data packet component 565 may transmit, to the second UE and the third UE, the data packet in the one or more resources. The operations performed by the control information component 560, the data packet component 565, or both may be performed by the transmitter 570 or the transceiver 720.

The transmitter 570 may transmit signals generated by other components of the device 505. In some examples, the transmitter 570 may be collocated with a receiver 510 in a transceiver module. For example, the transmitter 570 may be an example of aspects of the transceiver 720 described with reference to FIG. 7. The transmitter 570 may utilize a single antenna or a set of antennas.

Figure 6:
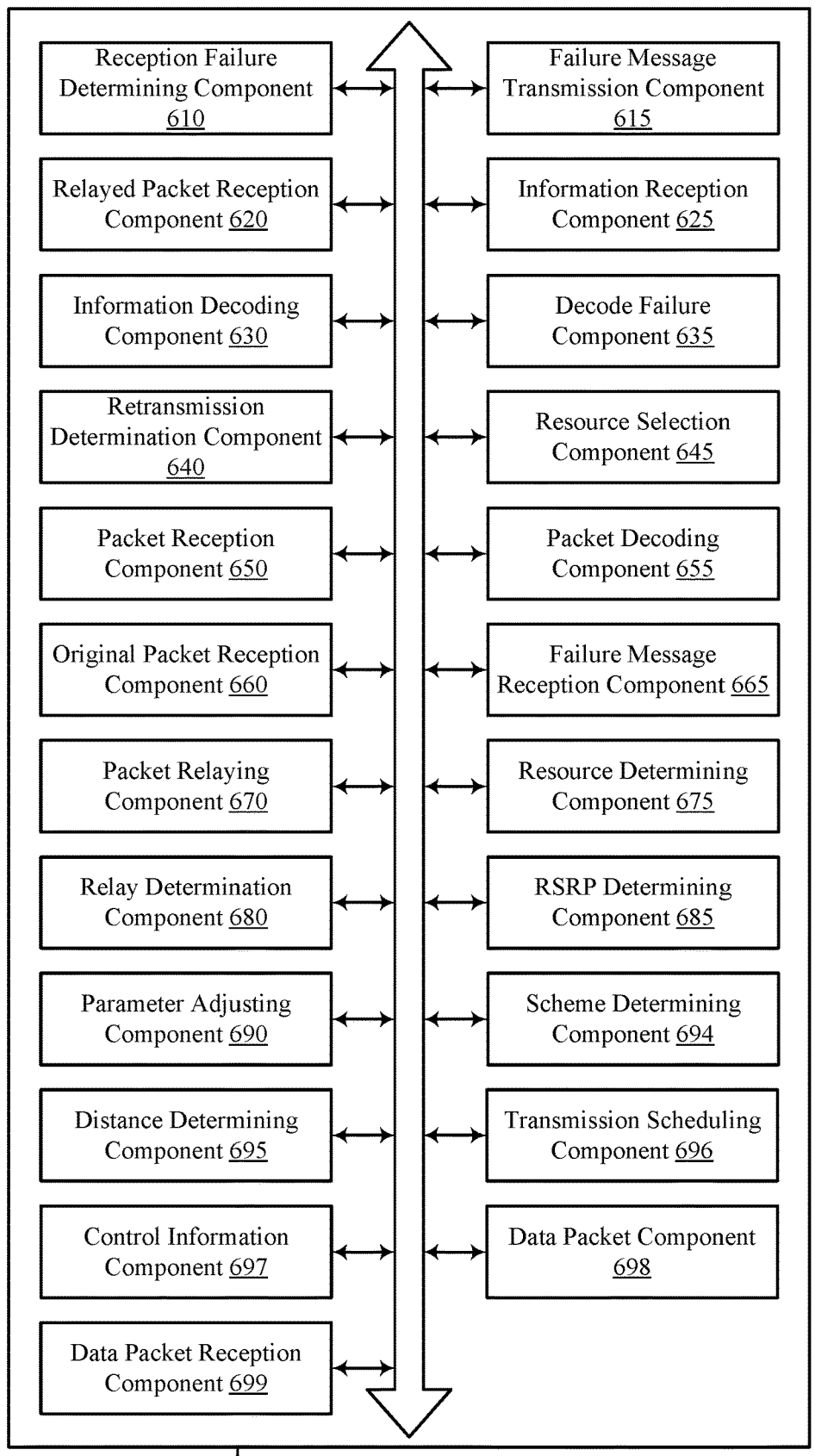
FIG. 6 shows a block diagram of a communications manager that supports on-demand relaying of messages for side-link communications, in accordance with one or more aspects of the present disclosure.

FIG. 6 shows a block diagram 600 of a communications manager 605 that supports on-demand relaying of messages for side-link communications, in accordance with one or more aspects of the present disclosure. The communications manager 605 may be an example of aspects of a communications manager 415, a communications manager 515, or a communications manager 710 described herein. The communications manager 605 may include any combination of a reception failure determining component 610, a failure message transmission component 615, a relayed packet reception component 620, an information reception component 625, an information decoding component 630, a decode failure component 635, a retransmission determination component 640, a resource selection component 645, a packet reception component 650, a packet decoding component 655, an original packet reception component 660, a failure message reception component 665, a packet relaying component 670, a resource determining component 675, a relay determination component 680, an RSRP determining component 685, a parameter adjusting component 690, a scheme determining component 694, a distance determining component 695, a transmission scheduling component 696, a control information component 697, a data packet component 698, and a data packet reception component 699. Each of these modules may communicate, directly or indirectly, with one another (e.g., via one or more buses). The communications manager 605 may be implemented for wireless communications at a first UE (e.g., a UE operating over side-link communication links).

The reception failure determining component 610 may determine a failure of the first UE to receive a data packet from a second UE. The failure message transmission component 615 may transmit a message indicating the failure of the first UE to receive the data packet. In some cases, the message indicating the failure of the first UE to receive the data packet is an example of a NAK message, a request for the data packet, or both. The relayed packet reception component 620 may receive, from a third UE different from the second UE, the data packet based on the message indicating the failure of the first UE to receive the data packet.

In some cases, determining the failure of the first UE to receive the data packet from the second UE may include further operations (e.g., performed by an information reception component 625, an information decoding component 630, and a decode failure component 635). The information reception component 625 may receive control information from the second UE. The information decoding component 630 may decode the control information, where the decoded control information indicates a resource for transmission of the data packet. The decode failure component 635 may fail to decode the data packet in the indicated resource. The retransmission determination component 640 may determine whether at least one further retransmission of the data packet is scheduled by the second UE based on the information indicated in the decoded control (i.e., the decoded control information). In some examples, the retransmission determination component 640 may determine an absence of one or more further retransmissions of the data packet scheduled by the second UE, where the message indicating the failure of the first UE to receive the data packet is transmitted based on determining the absence. For example, the retransmission determination component 640 may determine an absence of any further retransmissions of the data packet scheduled by the second UE.

In some cases, the decoded control information may indicate a second resource for retransmission of the data packet. In some cases, the reception failure determining component 610 may determine a failure to decode the data packet in the indicated second resource for retransmission. In some cases, the failure message transmission component 615 may transmit a second message indicating the failure to decode the data packet in the indicated second resource for retransmission.

In some cases, the failure message transmission component 615 may determine a cause of the failure of the first UE to receive the data packet, where the cause of the failure can be interference, or a weak signal, or a combination thereof. In some cases, the failure transmission component 615 may determine that the signal is weak based on an RSRP value of the transmission (e.g., an RSRP below a threshold value due to blocking/shadowing). The failure message transmission component 615 may determine whether to transmit the message indicating the failure of the first UE to receive the data packet to the second UE or the third UE or both based on the cause of the failure. For example, if the cause of the failure is the low signal energy of the transmission (e.g., the received signal energy of the transmission is below a received signal energy threshold), the message indicating the failure of the first UE to receive the data packet may be transmitted to the third UE (e.g., a nearby UE for relaying of the data packet). However, if the cause of the failure is interference, the message indicating the failure of the first UE to receive the data packet may be transmitted to the second UE for retransmission of the data packet. For example, the reception failure determining component 610 may determine an additional failure of the first UE to receive an additional data packet from the second UE. The failure message transmission component 615 may determine that a cause of the additional failure of the first UE to receive the additional data packet is interference and determine that at least one further retransmission of the additional data packet is scheduled by the second UE, where the at least one further retransmission is dependent on a NAK message. The failure message transmission component 615 may also transmit, to the second UE, a NAK message for the additional data packet based on the cause of the additional failure of the first UE to receive the additional data packet being interference. A receiver may receive, from the second UE, a retransmission of the additional data packet based on the NAK message.

The resource selection component 645 may select one or more resources for a resource reservation, where the message indicating the failure of the first UE to receive the data packet includes the resource reservation, and where the data packet is received on the one or more resources indicated by the resource reservation.

In some cases, the message indicating the failure of the first UE to receive the data packet may include an RSRP threshold, and receiving the data packet may include a packet reception component 650 receiving the data packet from the third UE based on the RSRP threshold. In some cases, the message indicating the failure of the first UE to receive the data packet may include a source ID indicating the second UE or a packet ID indicating the data packet or both. In some cases, the message indicating the failure of the first UE to receive the data packet may include a resource exclusion parameter, such as an exclusion range for a reserved resource (e.g., RSRP, distance). In some cases, the message indicating the failure of the first UE to receive the data packet may include an MCS, a transmission mode, an RV, a reference signal pattern, or a combination thereof. In some cases, receiving the data packet may include the packet reception component 650 receiving the data packet from the third UE based on the source ID or the packet ID or both. In some cases, receiving the data packet may include the packet reception component 650 receiving the data packet from the third UE based on the exclusion range for the reserved resource. In some cases, receiving the data packet may include the packet reception component 650 receiving the data packet from the third UE based on the MCS, the transmission mode, the RV, the reference signal pattern, or a combination thereof.

In some examples, the packet reception component 650 may receive, from a fourth UE different from the second UE and the third UE, the data packet based on the message indicating the failure of the first UE to receive the data packet. The packet decoding component 655 may decode the data packet based on combining information corresponding to receiving the data packet from the third UE and information corresponding to receiving the data packet from the fourth UE.

The original packet reception component 660 may receive a data packet from a second UE. The failure message reception component 665 may receive, from a third UE, a message indicating a failure of the third UE to receive the data packet. In some cases, the message indicating the failure of the third UE to receive the data packet is an example of a NAK message, a request for the data packet, or both. The packet relaying component 670 may relay the data packet to the third UE based on the message indicating the failure of the third UE to receive the data packet. In some cases, the message indicating the failure of the third UE to receive the data packet may include a source ID indicating the second UE or a packet ID indicating the data packet or both, and relaying the data packet to the third UE may include the packet relaying component 670 relaying the data packet to the third UE based on the source ID or the packet ID or both. In some cases, the message indicating the failure of the third UE to receive the data packet may include an exclusion range for a reserved resource, and relaying the data packet to the third UE may include the packet relaying component 670 relaying the data packet to the third UE based on the exclusion range for a reserved resource. In some cases, the message indicating the failure of the third UE to receive the data packet may include a transmission mode, an RV, a reference signal pattern, or a combination thereof. and relaying the data packet to the third UE may include the packet relaying component 670 relaying the data packet to the third UE based on the transmission mode, the RV, the reference signal pattern, or a combination thereof.

In some cases, the failure message reception component 665 may receive, from a fourth UE, a message indicating a failure of the fourth UE to receive an additional data packet, where the message includes a resource reservation. The relay determination component 680 may determine to refrain from relaying the additional data packet to the fourth UE in one or more resources indicated by the resource reservation and may refrain from communicating on one or more resources that overlap with the one or more resources indicated by the resource reservation based on the resource reservation.

In some examples, the data packet is received from the second UE according to an MCS, a spatial multiplexing scheme, a DMRS pattern, or a combination thereof, and relaying the data packet to the third UE involves the packet relaying component 670 relaying the data packet to the third UE according to the MCS, the spatial multiplexing scheme, the DMRS pattern, or a combination thereof. In some examples, the data packet is received from the second UE according to a first MCS, a first spatial multiplexing scheme, a first DMRS pattern, or a combination thereof, and relaying the data packet to the third UE involves the packet relaying component 670 relaying the data packet to the third UE according to a second MCS different from the first MCS, a second spatial multiplexing scheme different from the first spatial multiplexing scheme, a second DMRS pattern different from the first DMRS pattern, or a combination thereof. In some cases, the message indicating the failure of the third UE to receive the data packet may include an indication of the second MCS, the second spatial multiplexing scheme, the second DMRS pattern, or a combination thereof. The scheme determining component 694 may determine the second MCS, the second spatial multiplexing scheme, the second DMRS pattern, or a combination thereof based on the message indicating the failure of the third UE to receive the data packet.

In some cases, the message indicating the failure of the third UE to receive the data packet may include a resource reservation. In some of these cases, the resource determining component 675 may determine one or more resources indicated by the resource reservation. In some cases, the relay determination component 680 may determine to relay the data packet to the third UE based on the first UE supporting transmitting on the one or more resources, where the data packet is relayed to the third UE on the one or more resources indicated by the resource reservation.

The RSRP determining component 685 may determine an RSRP for receiving the message indicating the failure of the third UE to receive the data packet. In some cases, the relay determination component 680 may determine to relay the data packet to the third UE based on the determined RSRP being greater than an RSRP threshold. In some examples, the message indicating the failure of the third UE to receive the data packet includes the RSRP threshold, and the RSRP determining component 685 may determine the RSRP threshold based on the message indicating the failure of the third UE to receive the data packet. In some cases, the parameter adjusting component 690 may adjust a power control parameter for relaying the data packet to the third UE based on the determined RSRP.

The distance determining component 695 may determine a distance between the first UE and the third UE, and the relay determination component 680 may determine to relay the data packet to the third UE based on the determined distance being less than a distance threshold.

The transmission scheduling component 696 may schedule transmission of a data packet to a second UE and a third UE in one or more resources. The control information component 697 may transmit, to the second UE and the third UE, control information including a resource reservation indicating the one or more resources and including an indication enabling the second UE to relay the data packet to the third UE in response to a message indicating a failure of the third UE to receive the data packet. The data packet component 698 may transmit, to the second UE and the third UE, the data packet in the one or more resources. The data packet reception component 699 may receive, from the second UE, the data packet based on the message indicating the failure of the third UE to receive the data packet.

Figure 7:
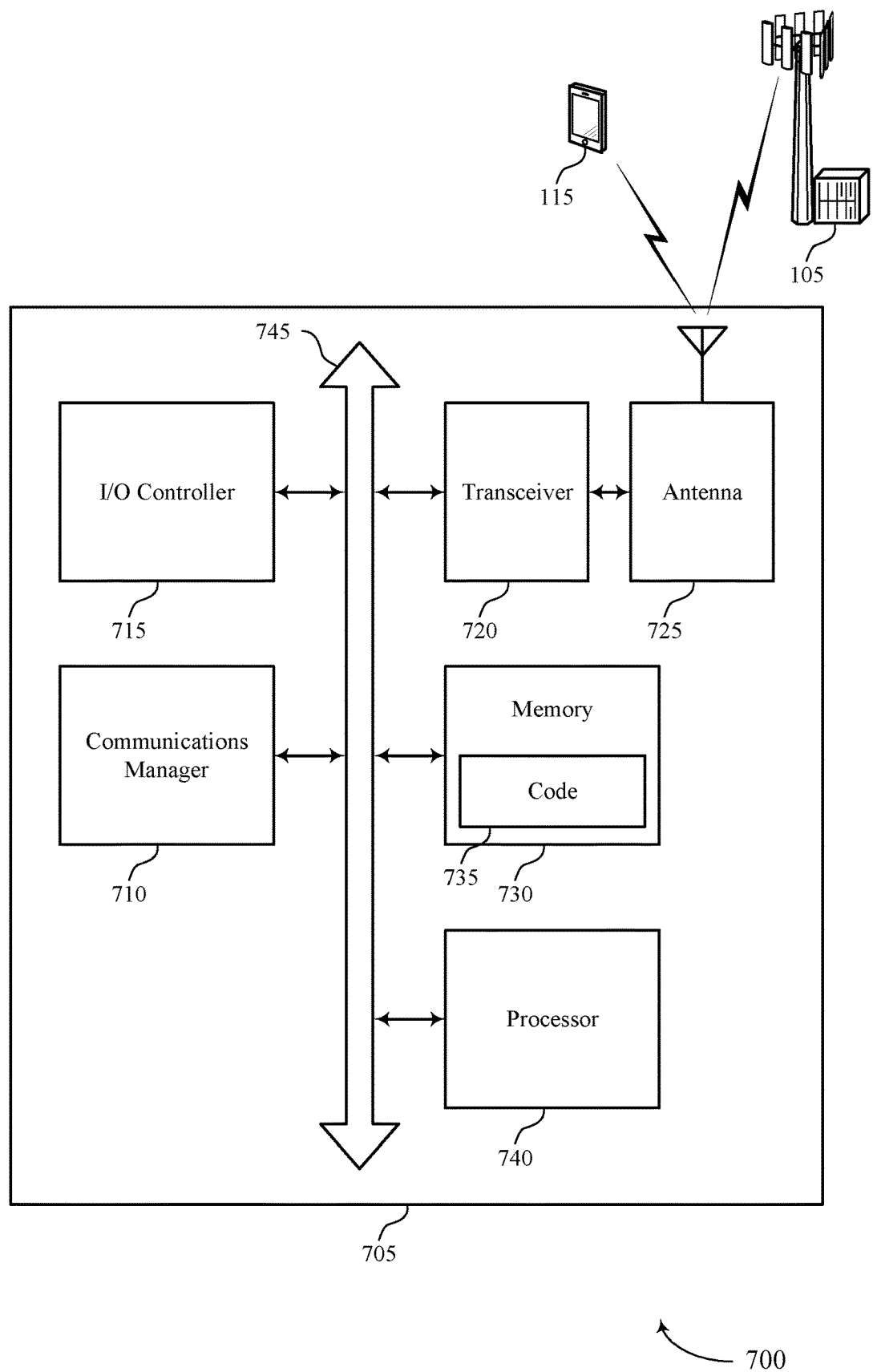
FIG. 7 shows a diagram of a system including a device that supports on-demand relaying of messages for side-link communications, in accordance with one or more aspects of the present disclosure.

FIG. 7 shows a diagram of a system 700 including a device 705 that supports on-demand relaying of messages for side-link communications, in accordance with one or more aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The device 705 may be an example or a component of a first UE. The communications manager 710 may identify a failure of the first UE to receive a data packet from a second UE in a transmission, transmit a message indicating the failure of the first UE to receive the data packet, and receive, from a third UE different from the second UE, the data packet based on the message indicating the failure of the first UE to receive the data packet. Additionally or alternatively, the communications manager 710 may receive a data packet from a second UE in a transmission, receive, from a third UE, a message indicating a failure of the third UE to receive the data packet, and relay the data packet to the third UE based on the message indicating the failure of the third UE to receive the data packet. Additionally or alternatively, the communications manager 710 may schedule transmission of a data packet to a second UE and a third UE in one or more resources, transmit, to the second UE and the third UE, control information including a resource reservation indicating the one or more resources and including an indication enabling the second UE to relay the data packet to the third UE in response to a message indicating a failure of the third UE to receive the data packet, and transmit, to the second UE and the third UE, the data packet in the one or more resources.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting on-demand relaying of messages for side-link communications).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
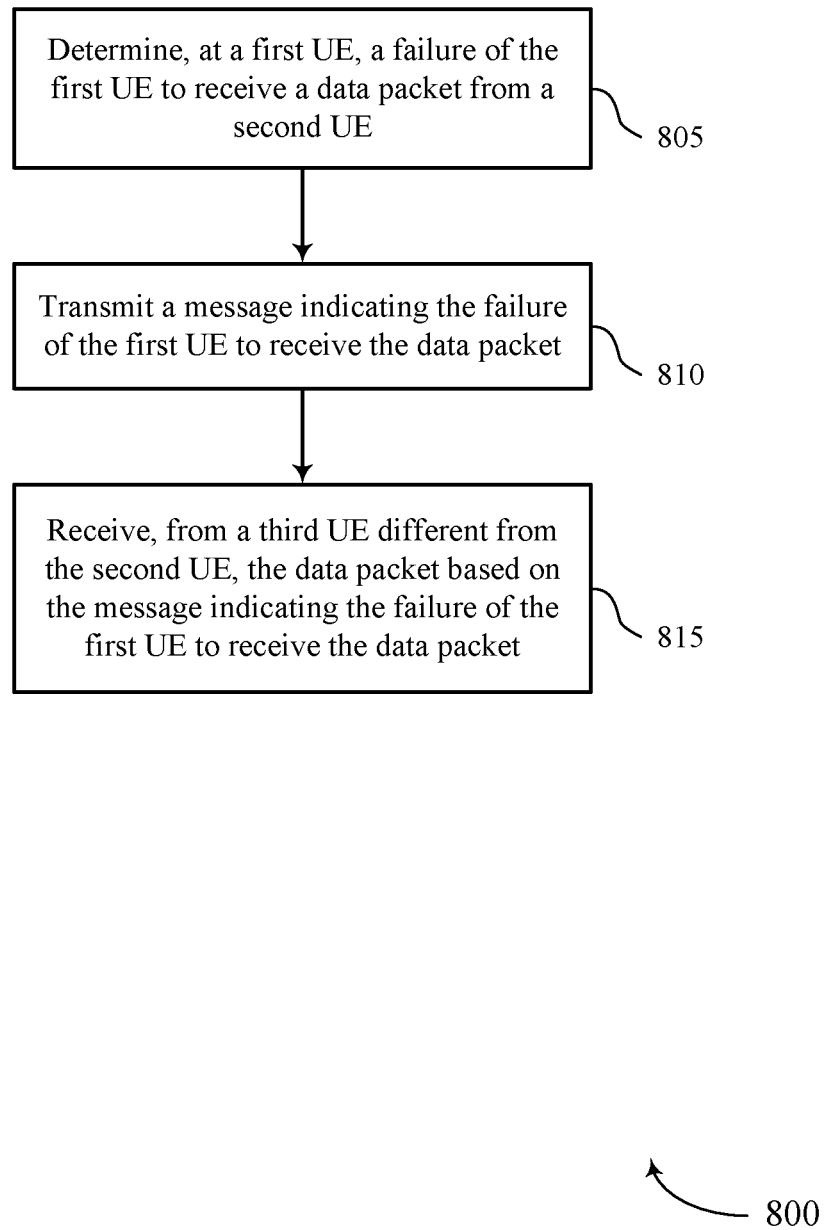
FIGS. 8 through 15 show flowcharts illustrating methods that support on-demand relaying of messages for side-link communications, in accordance with one or more aspects of the present disclosure.

FIG. 8 shows a flowchart illustrating a method 800 that supports on-demand relaying of messages for side-link communications, in accordance with one or more aspects of the present disclosure. The operations of method 800 may be implemented by a UE 115 (e.g., a vehicle) or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE (e.g., a first UE) may determine a failure of the first UE to receive a data packet from a second UE. The operations of 805 may be performed according to the methods described herein. In some examples, aspects of the operations of 805 may be performed by a reception failure determining component as described with reference to FIGS. 4 through 7.

At 810, the UE may transmit a message indicating the failure of the first UE to receive the data packet. The operations of 810 may be performed according to the methods described herein. In some examples, aspects of the operations of 810 may be performed by a failure message transmission component as described with reference to FIGS. 4 through 7.

At 815, the UE may receive, from a third UE different from the second UE, the data packet based on the message indicating the failure of the first UE to receive the data packet. The operations of 815 may be performed according to the methods described herein. In some examples, aspects of the operations of 815 may be performed by a relayed packet reception component as described with reference to FIGS. 4 through 7.

Figure 9:
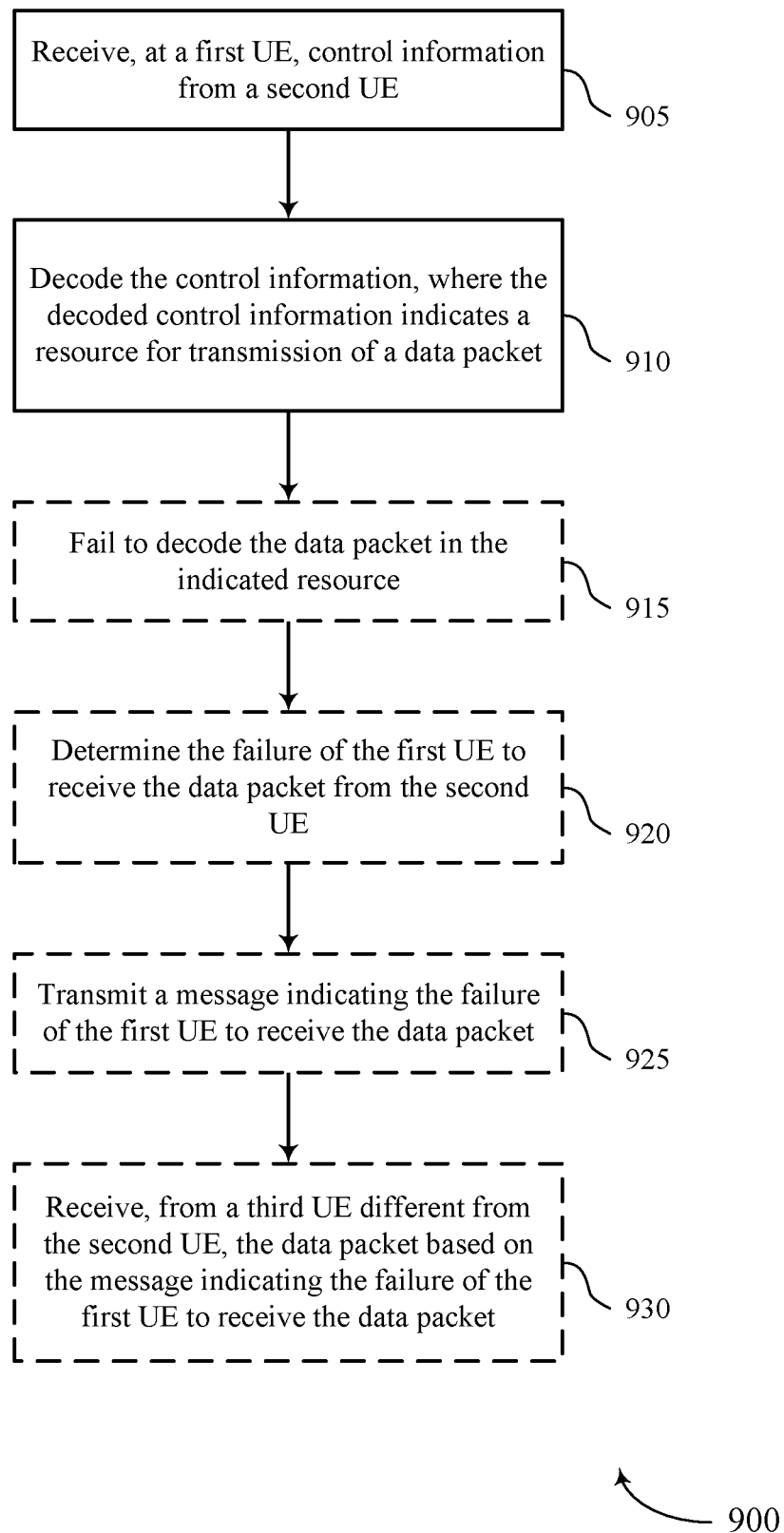

FIG. 9 shows a flowchart illustrating a method 900 that supports on-demand relaying of messages for side-link communications, in accordance with one or more aspects of the present disclosure. The operations of method 900 may be implemented by a UE 115 (e.g., a vehicle) or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE (e.g., a first UE) may receive control information from a second UE. The operations of 905 may be performed according to the methods described herein. In some examples, aspects of the operations of 905 may be performed by an information reception component as described with reference to FIGS. 4 through 7.

At 910, the UE may decode the control information, where the decoded control information indicates a resource for transmission of a data packet. The operations of 910 may be performed according to the methods described herein. In some examples, aspects of the operations of 910 may be performed by an information decoding component as described with reference to FIGS. 4 through 7.

At 915, the UE may fail to decode the data packet in the indicated resource. The operations of 915 may be performed according to the methods described herein. In some examples, aspects of the operations of 915 may be performed by a decode failure component as described with reference to FIGS. 4 through 7.

At 920, the UE may determine the failure of the first UE to receive the data packet from the second UE. In some cases, the UE may determine the reason for the failure (e.g., interference or blocking/shadowing) and may determine whether to transmit a message indicating the failure based on the reason. For example, if the UE determines that the UE failed to receive the data packet due to blocking/shadowing in the system, the UE may transmit the message (e.g., to a nearby UE different from the second UE) requesting a relayed data packet. The operations of 920 may be performed according to the methods described herein. In some examples, aspects of the operations of 920 may be performed by a reception failure determining component as described with reference to FIGS. 4 through 7.

At 925, the UE may transmit a message indicating the failure of the first UE to receive the data packet. The operations of 925 may be performed according to the methods described herein. In some examples, aspects of the operations of 925 may be performed by a failure message transmission component as described with reference to FIGS. 4 through 7.

At 930, the UE may receive, from a third UE different from the second UE, the data packet based on the message indicating the failure of the first UE to receive the data packet. The operations of 930 may be performed according to the methods described herein. In some examples, aspects of the operations of 930 may be performed by a relayed packet reception component as described with reference to FIGS. 4 through 7.

Figure 10:
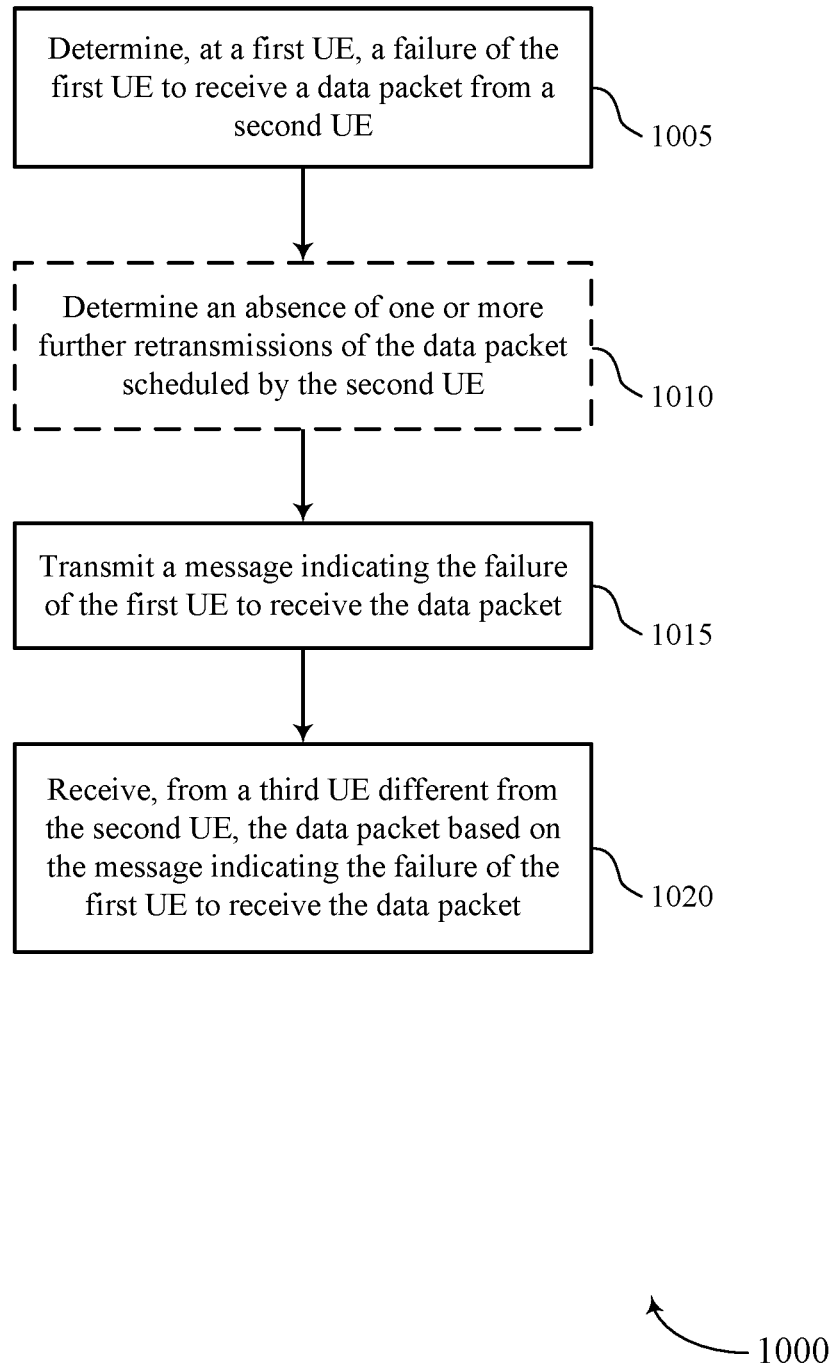

FIG. 10 shows a flowchart illustrating a method 1000 that supports on-demand relaying of messages for side-link communications, in accordance with one or more aspects of the present disclosure. The operations of method 1000 may be implemented by a UE 115 (e.g., a vehicle) or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE (e.g., a first UE) may determine a failure of the first UE to receive a data packet from a second UE. The operations of 1005 may be performed according to the methods described herein. In some examples, aspects of the operations of 1005 may be performed by a reception failure determining component as described with reference to FIGS. 4 through 7.

At 1010, the UE may determine an absence of one or more further retransmissions of the data packet scheduled by the second UE. In some cases, the message indicating the failure of the first UE to receive the data packet may be transmitted based on determining the absence. The operations of 1010 may be performed according to the methods described herein. In some examples, aspects of the operations of 1010 may be performed by a retransmission determination component as described with reference to FIGS. 4 through 7.

At 1015, the UE may transmit a message indicating the failure of the first UE to receive the data packet (e.g., where the message may be transmitted based on determining that no further retransmissions are scheduled). The operations of 1015 may be performed according to the methods described herein. In some examples, aspects of the operations of 1015 may be performed by a failure message transmission component as described with reference to FIGS. 4 through 7.

At 1020, the UE may receive, from a third UE different from the second UE, the data packet based on the message indicating the failure of the first UE to receive the data packet. The operations of 1020 may be performed according to the methods described herein. In some examples, aspects of the operations of 1020 may be performed by a relayed packet reception component as described with reference to FIGS. 4 through 7.

Figure 11:
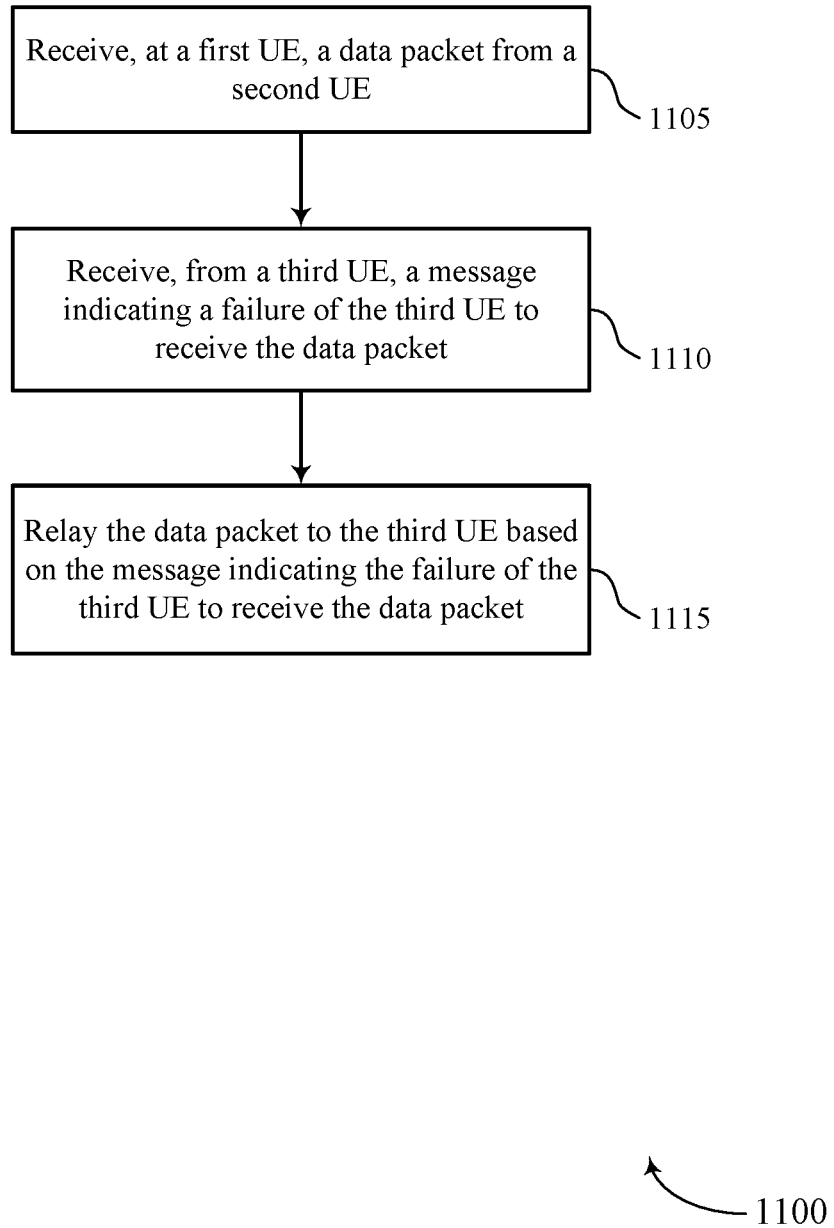

FIG. 11 shows a flowchart illustrating a method 1100 that supports on-demand relaying of messages for side-link communications, in accordance with one or more aspects of the present disclosure. The operations of method 1100 may be implemented by a UE 115 (e.g., a vehicle) or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE (e.g., a first UE) may receive a data packet from a second UE. The operations of 1105 may be performed according to the methods described herein. In some examples, aspects of the operations of 1105 may be performed by an original packet reception component as described with reference to FIGS. 4 through 7.

At 1110, the UE may receive, from a third UE, a message indicating a failure of the third UE to receive the data packet. The operations of 1110 may be performed according to the methods described herein. In some examples, aspects of the operations of 1110 may be performed by a failure message reception component as described with reference to FIGS. 4 through 7.

At 1115, the UE may relay the data packet to the third UE based on the message indicating the failure of the third UE to receive the data packet. The operations of 1115 may be performed according to the methods described herein. In some examples, aspects of the operations of 1115 may be performed by a packet relaying component as described with reference to FIGS. 4 through 7.

Figure 12:
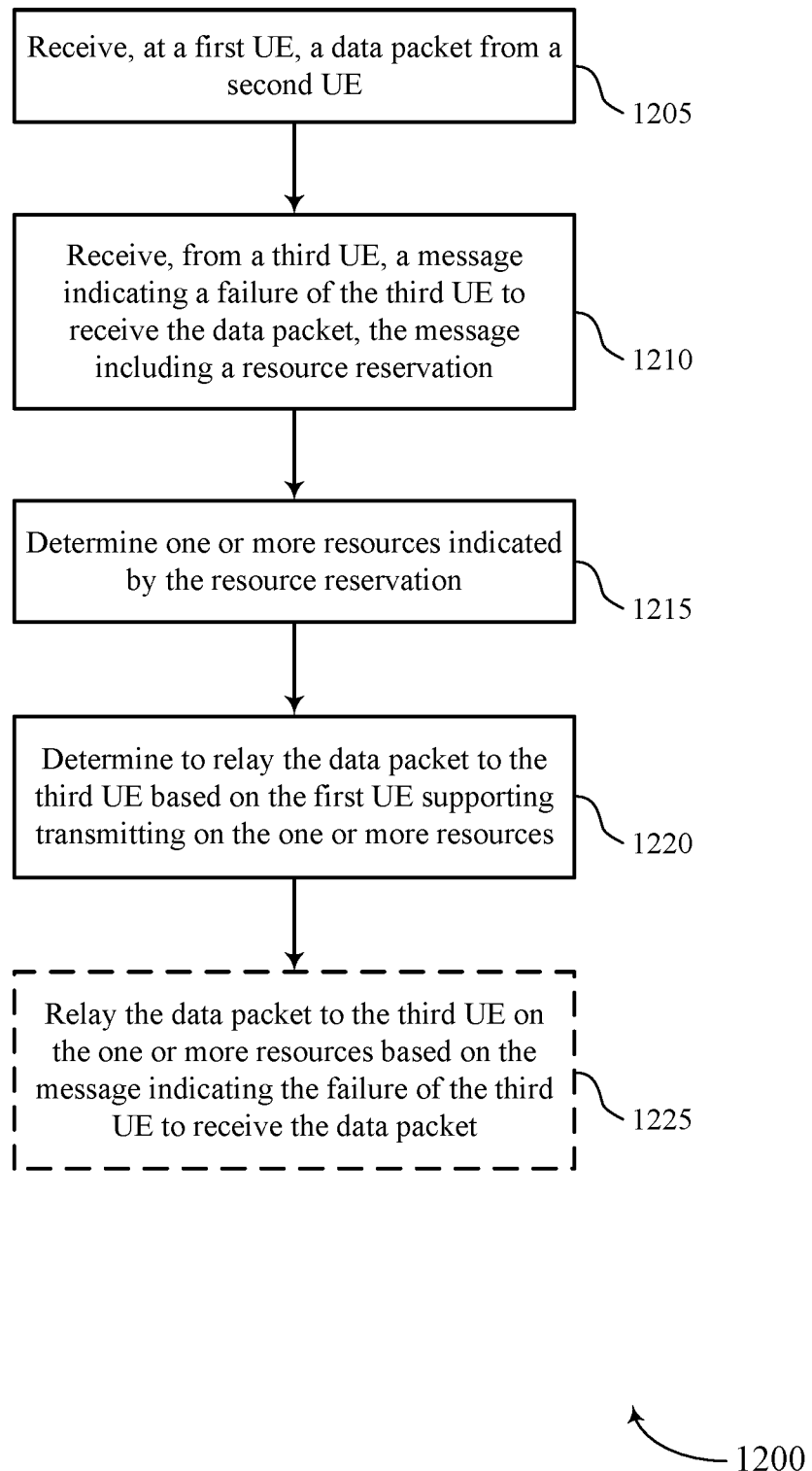

FIG. 12 shows a flowchart illustrating a method 1200 that supports on-demand relaying of messages for side-link communications, in accordance with one or more aspects of the present disclosure. The operations of method 1200 may be implemented by a UE 115 (e.g., a vehicle) or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE (e.g., a first UE) may receive a data packet from a second UE. The operations of 1205 may be performed according to the methods described herein. In some examples, aspects of the operations of 1205 may be performed by an original packet reception component as described with reference to FIGS. 4 through 7.

At 1210, the UE may receive, from a third UE, a message indicating a failure of the third UE to receive the data packet, where the message includes a resource reservation. The operations of 1210 may be performed according to the methods described herein. In some examples, aspects of the operations of 1210 may be performed by a failure message reception component as described with reference to FIGS. 4 through 7.

At 1215, the UE may determine one or more resources indicated by the resource reservation. The operations of 1215 may be performed according to the methods described herein. In some examples, aspects of the operations of 1215 may be performed by a resource determining component as described with reference to FIGS. 4 through 7.

At 1220, the UE may determine to relay the data packet to the third UE based on the first UE supporting transmitting on the one or more resources. In some cases, the data packet is relayed to the third UE on the one or more resources indicated by the resource reservation. The operations of 1220 may be performed according to the methods described herein. In some examples, aspects of the operations of 1220 may be performed by a relay determination component as described with reference to FIGS. 4 through 7.

At 1225, the UE may relay the data packet to the third UE based on the message indicating the failure of the third UE to receive the data packet, where the data packet is relayed to the third UE on the resource indicated by the resource reservation. The operations of 1225 may be performed according to the methods described herein. In some examples, aspects of the operations of 1225 may be performed by a packet relaying component as described with reference to FIGS. 4 through 7.

Figure 13:
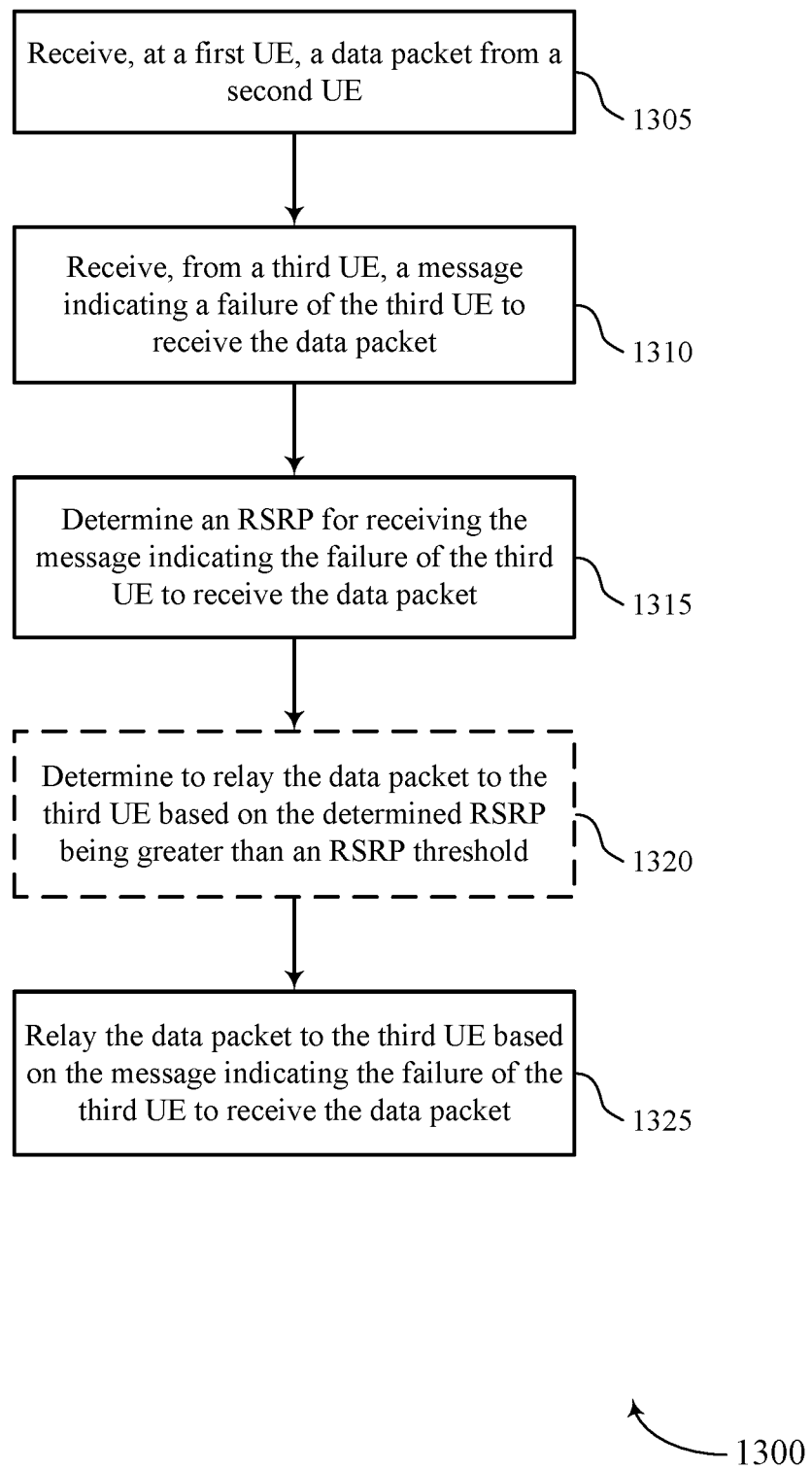

FIG. 13 shows a flowchart illustrating a method 1300 that supports on-demand relaying of messages for side-link communications, in accordance with one or more aspects of the present disclosure. The operations of method 1300 may be implemented by a UE 115 (e.g., a vehicle) or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE (e.g., a first UE) may receive a data packet from a second UE. The operations of 1305 may be performed according to the methods described herein. In some examples, aspects of the operations of 1305 may be performed by an original packet reception component as described with reference to FIGS. 4 through 7.

At 1310, the UE may receive, from a third UE, a message indicating a failure of the third UE to receive the data packet. The operations of 1310 may be performed according to the methods described herein. In some examples, aspects of the operations of 1310 may be performed by a failure message reception component as described with reference to FIGS. 4 through 7.

At 1315, the UE may determine an RSRP for receiving the message indicating the failure of the third UE to receive the data packet. The operations of 1315 may be performed according to the methods described herein. In some examples, aspects of the operations of 1315 may be performed by an RSRP determining component as described with reference to FIGS. 4 through 7.

At 1320, the UE may determine to relay the data packet to the third UE based on the determined RSRP being greater than an RSRP threshold. The operations of 1320 may be performed according to the methods described herein. In some examples, aspects of the operations of 1320 may be performed by a relay determination component as described with reference to FIGS. 4 through 7.

At 1325, the UE may relay the data packet to the third UE based on the message indicating the failure of the third UE to receive the data packet. The operations of 1325 may be performed according to the methods described herein. In some examples, aspects of the operations of 1325 may be performed by a packet relaying component as described with reference to FIGS. 4 through 7.

Figure 14:
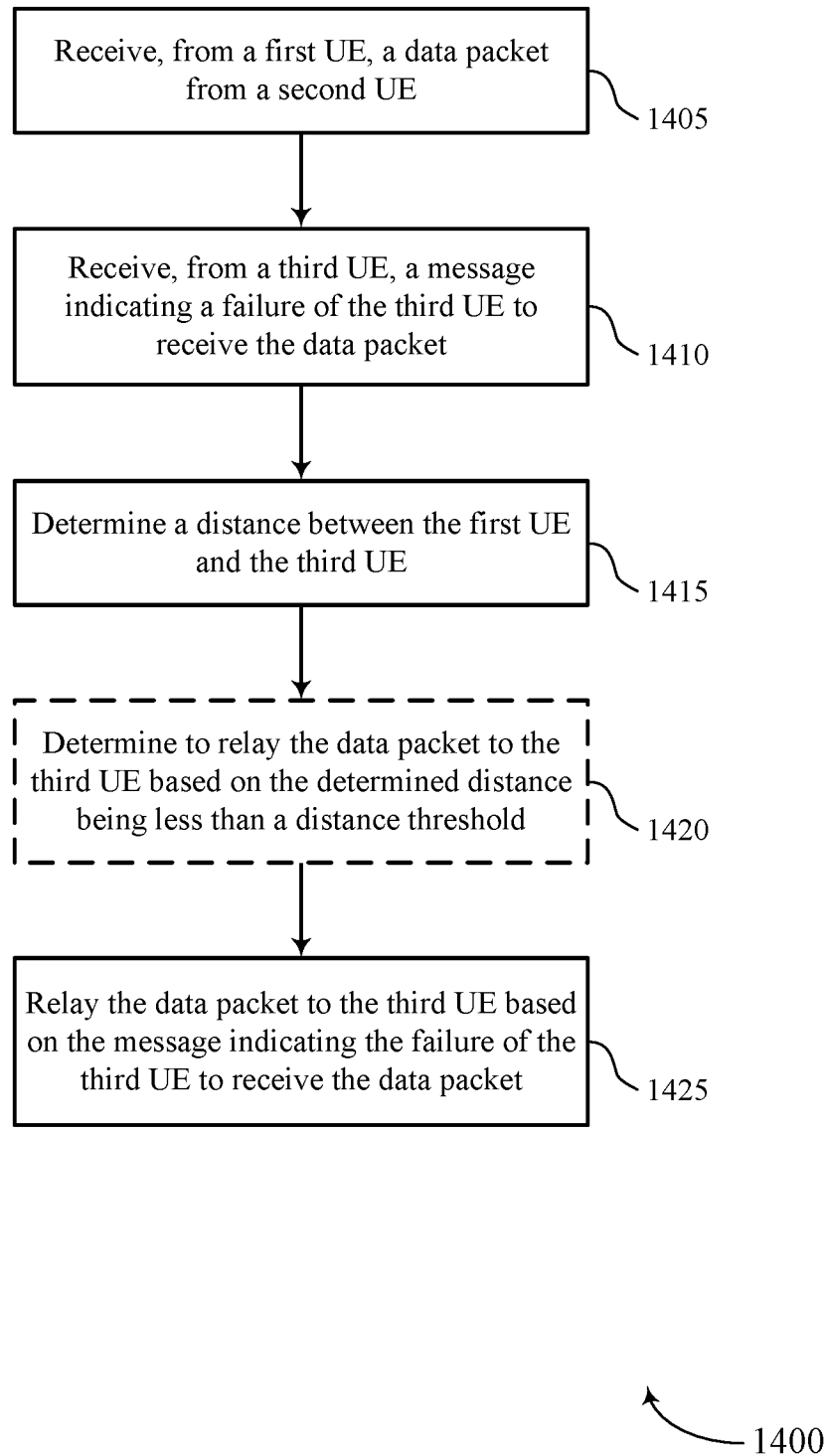

FIG. 14 shows a flowchart illustrating a method 1400 that supports on-demand relaying of messages for side-link communications, in accordance with one or more aspects of the present disclosure. The operations of method 1400 may be implemented by a UE 115 (e.g., a vehicle) or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE (e.g., a first UE) may receive a data packet from a second UE. The operations of 1405 may be performed according to the methods described herein. In some examples, aspects of the operations of 1405 may be performed by an original packet reception component as described with reference to FIGS. 4 through 7.

At 1410, the UE may receive, from a third UE, a message indicating a failure of the third UE to receive the data packet. The operations of 1410 may be performed according to the methods described herein. In some examples, aspects of the operations of 1410 may be performed by a failure message reception component as described with reference to FIGS. 4 through 7.

At 1415, the UE may determine a distance between the first UE and the third UE. The operations of 1415 may be performed according to the methods described herein. In some examples, aspects of the operations of 1415 may be performed by a distance determining component as described with reference to FIGS. 4 through 7.

At 1420, the UE may determine to relay the data packet to the third UE based on the determined distance being less than a distance threshold. The operations of 1420 may be performed according to the methods described herein. In some examples, aspects of the operations of 1420 may be performed by a relay determination component as described with reference to FIGS. 4 through 7.

At 1425, the UE may relay the data packet to the third UE based on the message indicating the failure of the third UE to receive the data packet. The operations of 1425 may be performed according to the methods described herein. In some examples, aspects of the operations of 1425 may be performed by a packet relaying component as described with reference to FIGS. 4 through 7.

Figure 15:
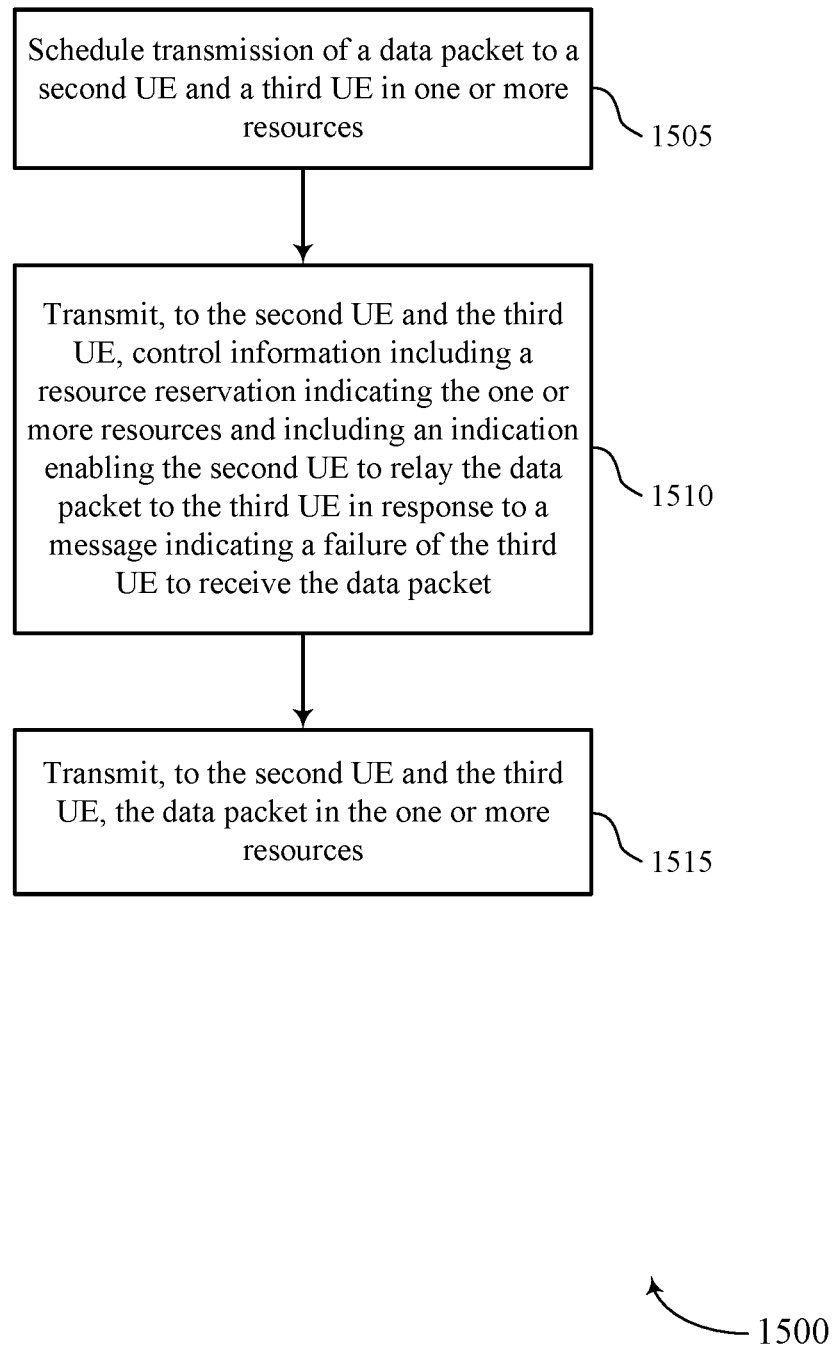

FIG. 15 shows a flowchart illustrating a method 1500 that supports on-demand relaying of messages for side-link communications, in accordance with one or more aspects of the present disclosure. The operations of method 1500 may be implemented by a UE 115 (e.g., a vehicle) or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE (e.g., a first UE) may schedule transmission of a data packet to a second UE and a third UE in the one or more resources. The operations of 1505 may be performed according to the methods described herein. In some examples, aspects of the operations of 1505 may be performed by an original packet reception component as described with reference to FIGS. 4 through 7.

At 1510, the UE may transmit, to the second UE and the third UE, control information including a resource reservation indicating the one or more resources and including an indication enabling the second UE to relay the data packet to the third UE in response to a message indicating a failure of the third UE to receive the data packet. The operations of 1510 may be performed according to the methods described herein. In some examples, aspects of the operations of 1510 may be performed by a failure message reception component as described with reference to FIGS. 4 through 7.

At 1515, the UE may transmit, to the second UE and the third UE, the data packet in the one or more resources. The operations of 1515 may be performed according to the methods described herein. In some examples, aspects of the operations of 1515 may be performed by a distance determining component as described with reference to FIGS. 4 through 7.

It should be noted that the methods described herein describe possible implementations, and that the operations and the operations may be rearranged or otherwise modified and that other implementations are possible. Further, aspects from two or more of the methods may be combined.

Example 1

A method for wireless communications at a first UE, comprising: determining a failure of the first UE to receive a data packet from a second UE; transmitting a message indicating the failure of the first UE to receive the data packet; and receiving, from a third UE different from the second UE, the data packet based at least in part on the message indicating the failure of the first UE to receive the data packet.

Example 2

The method of example 1, wherein determining the failure of the first UE to receive the data packet from the second UE comprises: receiving control information from the second UE; decoding the control information, wherein the decoded control information indicates a resource for transmission of the data packet; and failing to decode the data packet in the indicated resource.

Example 3

The method of example 2, further comprising: determining whether at least one further retransmission of the data packet is scheduled by the second UE based at least in part on the decoded control information.

Example 4

The method of any of examples 2 or 3, further comprising: determining an absence of one or more further retransmissions of the data packet scheduled by the second UE, wherein the message indicating the failure of the first UE to receive the data packet is transmitted based at least in part on determining the absence.

Example 5

The method of any of examples 2 to 4, wherein the decoded control information further indicates a second resource for retransmission of the data packet, the method further comprising: determining a failure to decode the data packet in the indicated second resource for retransmission; and transmitting a second message indicating the failure to decode the data packet in the indicated second resource for retransmission.

Example 6

The method of any of examples 1 to 5, further comprising: determining a cause of the failure of the first UE to receive the data packet, wherein the cause of the failure is interference, a received signal energy of the transmission being below a received signal energy threshold, or a combination thereof.

Example 7

The method of example 6, further comprising: determining whether to transmit the message indicating the failure of the first UE to receive the data packet to the second UE or the third UE or both based at least in part on the cause of the failure.

Example 8

The method of any of examples 6 or 7, further comprising: determining an additional failure of the first UE to receive an additional data packet from the second UE; determining that a cause of the additional failure of the first UE to receive the additional data packet is interference; determining that at least one further retransmission of the additional data packet is scheduled by the second UE, wherein the at least one further retransmission is dependent on a NAK message; transmitting, to the second UE, a NAK message for the additional data packet based at least in part on the cause of the additional failure of the first UE to receive the additional data packet being interference; and receiving, from the second UE, a retransmission of the additional data packet based at least in part on the NAK message.

Example 9

The method of any of examples 6 to 8, wherein: the cause of the failure is the received signal energy of the transmission being below the received signal energy threshold; and the message indicating the failure of the first UE to receive the data packet is transmitted to the third UE.

Example 10

The method of any of examples 1 to 9, further comprising: selecting one or more resources for a resource reservation, wherein the message indicating the failure of the first UE to receive the data packet comprises the resource reservation, and wherein the data packet is received on the one or more resources indicated by the resource reservation.

Example 11

The method of any of examples 1 to 10, wherein the message indicating the failure of the first UE to receive the data packet comprises a source ID indicating the second UE or a packet ID indicating the data packet or both.

Example 12

The method of example 11, wherein receiving the data packet comprises: receiving the data packet from the third UE based at least in part on the source ID or the packet ID or both.

Example 13

The method of any of examples 1 to 12, wherein the message indicating the failure of the first UE to receive the data packet comprises an exclusion range for a reserved resource, an MCS, a transmission mode, an RV, a reference signal pattern, or a combination thereof, and wherein receiving the data packet comprises: receiving the data packet from the third UE based at least in part on the exclusion range for the reserved resource, the MCS, the transmission mode, the RV, the reference signal pattern, or a combination thereof.

Example 14

The method of any of examples 1 to 13, further comprising: receiving, from a fourth UE different from the second UE and the third UE, the data packet based at least in part on the message indicating the failure of the first UE to receive the data packet; and decoding the data packet based at least in part on combining information corresponding to receiving the data packet from the third UE and information corresponding to receiving the data packet from the fourth UE.

Example 15

The method of any of examples 1 to 14, wherein the message indicating the failure of the first UE to receive the data packet comprises a NAK message or a request for the data packet or both.

Example 16

An apparatus comprising at least one means for performing a method of any of examples 1 to 15.

Example 17

An apparatus for wireless communications comprising a processor; and memory coupled to the processor, the processor and memory configured to perform a method of any of examples 1 to 15.

Example 18

A non-transitory computer-readable medium storing code for wireless communications, the code comprising instructions executable by a processor to perform a method of any of examples 1 to 15.

Example 19

A method for wireless communications at a first UE, comprising: receiving a data packet from a second UE; receiving, from a third UE, a message indicating a failure of the third UE to receive the data packet; and relaying the data packet to the third UE based at least in part on the message indicating the failure of the third UE to receive the data packet.

Example 20

The method of example 19, wherein the message indicating the failure of the third UE to receive the data packet comprises a resource reservation, the method further comprising: determining one or more resources indicated by the resource reservation; and determining to relay the data packet to the third UE based at least in part on the first UE supporting transmitting on the one or more resources, wherein the data packet is relayed to the third UE on the one or more resources indicated by the resource reservation.

Example 21

The method of any of examples 19 or 20, further comprising: determining an RSRP for receiving the message indicating the failure of the third UE to receive the data packet; and determining to relay the data packet to the third UE based at least in part on the determined RSRP being greater than an RSRP threshold.

Example 22

The method of example 21, wherein the message indicating the failure of the third UE to receive the data packet comprises the RSRP threshold, the method further comprising: determining the RSRP threshold based at least in part on the message indicating the failure of the third UE to receive the data packet.

Example 23

The method of any of examples 21 or 22, further comprising: adjusting a power control parameter for relaying the data packet to the third UE based at least in part on the determined RSRP.

Example 24

The method of any of examples 19 to 23, further comprising: receiving, from a fourth UE, a message indicating a failure of the fourth UE to receive an additional data packet, wherein the message indicating the failure of the fourth UE to receive the additional data packet comprises a resource reservation; determining to refrain from relaying the additional data packet to the fourth UE in one or more resources indicated by the resource reservation; and refraining from communicating on one or more resources that overlap with the one or more resources indicated by the resource reservation based at least in part on the resource reservation.

Example 25

The method of any of examples 19 to 24, wherein the data packet is received from the second UE according to an MCS, a spatial multiplexing scheme, and a DMRS pattern, and wherein relaying the data packet to the third UE comprises: relaying the data packet to the third UE according to the MCS, the spatial multiplexing scheme, the DMRS pattern, or a combination thereof.

Example 26

The method of any of examples 19 to 25, wherein the data packet is received from the second UE according to a first MCS, a first spatial multiplexing scheme, and a first DMRS pattern, and wherein relaying the data packet to the third UE comprises: relaying the data packet to the third UE according to a second MCS different from the first MCS, a second spatial multiplexing scheme different from the first spatial multiplexing scheme, a second DMRS pattern different from the first DMRS pattern, or a combination thereof.

Example 27

The method of example 26, wherein the message indicating the failure of the third UE to receive the data packet comprises an indication of the second MCS, the second spatial multiplexing scheme, the second DMRS pattern, or a combination thereof, the method further comprising: determining the second MCS, the second spatial multiplexing scheme, the second DMRS pattern, or a combination thereof based at least in part on the message indicating the failure of the third UE to receive the data packet.

Example 28

The method of any of examples 19 to 27, further comprising: determining a distance between the first UE and the third UE; and determining to relay the data packet to the third UE based at least in part on the determined distance being less than a distance threshold.

Example 29

The method of any of examples 19 to 28, wherein the message indicating the failure of the third UE to receive the data packet comprises a source ID indicating the second UE, a packet ID indicating the data packet, an exclusion range for a reserved resource, a transmission mode, an RV, a reference signal pattern, or a combination thereof, and wherein relaying the data packet to the third UE comprises: relaying the data packet to the third UE based at least in part on the source ID, the packet ID, the exclusion range for the reserved resource, the transmission mode, the RV, the reference signal pattern, or a combination thereof.

Example 30

The method of any of examples 19 to 29, wherein the message indicating the failure of the third UE to receive the data packet comprises a NAK message or a request for the data packet or both.

Example 31

An apparatus comprising at least one means for performing a method of any of examples 19 to 30.

Example 32

An apparatus for wireless communications comprising a processor; and memory coupled to the processor, the processor and memory configured to perform a method of any of examples 19 to 30.

Example 33

A non-transitory computer-readable medium storing code for wireless communications, the code comprising instructions executable by a processor to perform a method of any of examples 19 to 30.

Example 34

A method for wireless communications at a first UE, comprising: scheduling transmission of a data packet to a second UE and a third UE in one or more resources; transmitting, to the second UE and the third UE, control information comprising a resource reservation indicating the one or more resources and comprising an indication enabling the second UE to relay the data packet to the third UE in response to a message indicating a failure of the third UE to receive the data packet; and transmitting, to the second UE and the third UE, the data packet in the one or more resources.

Example 35

The method of example 34, further comprising: receiving, from the second UE, the data packet based at least in part on the message indicating the failure of the third UE to receive the data packet.

Example 36

An apparatus comprising at least one means for performing a method of any of examples 34 or 35.

Example 37

An apparatus for wireless communications comprising a processor; and memory coupled to the processor, the processor and memory configured to perform a method of any of examples 34 or 35.

Example 38

A non-transitory computer-readable medium storing code for wireless communications, the code comprising instructions executable by a processor to perform a method of any of examples 34 or 35.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:

receiving, from a second UE, control information indicating a resource for receiving a transmission of a data packet from the second UE via a first side-link;
determining a failure of the first UE to receive the data packet directly from the second UE via the first side-link;
transmitting, to at least a third UE via a second side-link, a message comprising an indication of the failure of the first UE to receive the data packet directly from the second UE, wherein the second side-link is different from the first side-link, and wherein the message comprising the indication of the failure of the first UE to receive the data packet comprises a resource reservation and one or more resources indicated by the resource reservation; and
receiving, directly from the third UE different from the second UE on the one or more resources indicated by the resource reservation and via the second side-link, the data packet in response to the message comprising the indication of the failure of the first UE to receive the data packet directly from the second UE.

2. The method of claim 1, wherein determining the failure of the first UE to receive the data packet from the second UE comprises:
decoding the control information, wherein the decoded control information indicates the resource for receiving the transmission of the data packet; and
failing to decode the data packet in the indicated resource.

3. The method of claim 2, further comprising:
determining whether at least one further retransmission of the data packet is scheduled by the second UE based at least in part on the decoded control information.

4. The method of claim 2, further comprising:
determining an absence of one or more further retransmissions of the data packet scheduled by the second UE, wherein the message comprising the indication of the failure of the first UE to receive the data packet is transmitted based at least in part on determining the absence.

5. The method of claim 2, wherein the decoded control information further indicates a second resource for retransmission of the data packet, the method further comprising:
determining an additional failure to decode the data packet in the indicated second resource for retransmission; and
transmitting a second message comprising an additional indication of the additional failure to decode the data packet in the indicated second resource for retransmission.

6. The method of claim 1, further comprising:
determining a cause of the failure of the first UE to receive the data packet, wherein the cause of the failure is interference, a received signal energy of transmission of the data packet being below a received signal energy threshold, or a combination thereof.

7. The method of claim 6, further comprising:
determining whether to transmit the message comprising the indication of the failure of the first UE to receive the data packet to the second UE or the third UE or both based at least in part on the cause of the failure.

8. The method of claim 6, further comprising:
determining an additional failure of the first UE to receive an additional data packet from the second UE;
determining that a cause of the additional failure of the first UE to receive the additional data packet is interference;

determining that at least one further retransmission of the additional data packet is scheduled by the second UE, wherein the at least one further retransmission is dependent on a negative acknowledgment message;

transmitting, to the second UE, the negative acknowledgment message for the additional data packet based at least in part on the cause of the additional failure of the first UE to receive the additional data packet being interference; and receiving, from the second UE, a retransmission of the additional data packet based at least in part on the negative acknowledgment message.

9. The method of claim 6, wherein:
the cause of the failure is the received signal energy of the transmission of the data packet being below the received signal energy threshold; and
the message comprising the indication of the failure of the first UE to receive the data packet is transmitted to the third UE.

10. The method of claim 1, further comprising:
selecting the one or more resources for a resource reservation, wherein transmitting the message comprising the indication of the failure of the first UE to receive the data packet comprising the resource reservation is based at least in part on the selecting.

11. The method of claim 1, wherein the message comprising the indication of the failure of the first UE to receive the data packet comprises a source identifier indicating the second UE or a packet identifier indicating the data packet or both.

12. The method of claim 11, wherein receiving the data packet comprises:
receiving the data packet from the third UE based at least in part on the source identifier or the packet identifier or both.

13. The method of claim 1, wherein the message comprising the indication of the failure of the first UE to receive the data packet comprises an exclusion range for a reserved resource, a modulation and coding scheme, a transmission mode, a redundancy version, a reference signal pattern, or a combination thereof, and wherein receiving the data packet comprises:
receiving the data packet from the third UE based at least in part on the exclusion range for the reserved resource, the modulation and coding scheme, the transmission mode, the redundancy version, the reference signal pattern, or a combination thereof.

14. The method of claim 1, further comprising:
receiving, from a fourth UE different from the second UE and the third UE, the data packet based at least in part on the message comprising the indication of the failure of the first UE to receive the data packet; and
decoding the data packet based at least in part on combining information corresponding to receiving the data packet from the third UE and information corresponding to receiving the data packet from the fourth UE.

15. The method of claim 1, wherein the message comprising the indication of the failure of the first UE to receive the data packet comprises a negative acknowledgment message or a request for the data packet or both.

16. A method for wireless communications at a first user equipment (UE), comprising:
receiving, from a second UE, control information indicating a resource for receiving a transmission of a data packet from the second UE via a first side-link;
receiving the data packet directly from the second UE via the first side-link;

receiving, from a third UE via a second side-link, a message comprising an indication of a failure of the third UE to receive the data packet directly from the second UE, wherein the second side-link is different from the first side-link, and wherein the message comprising the indication of the failure of the third UE to receive the data packet comprises a resource reservation and one or more resources indicated by the resource reservation; and relaying the data packet directly to the third UE on the one or more resources indicated by the resource reservation and, via the second side-link, in response to the message comprising the indication of the failure of the third UE to receive the data packet directly from the second UE.

17. The method of claim 16, further comprising:
determining the one or more resources indicated by the resource reservation; and
determining to relay the data packet to the third UE based at least in part on the first UE supporting transmitting on the one or more resources.

18. The method of claim 16, further comprising:
determining a reference signal received power for receiving the message comprising the indication of the failure of the third UE to receive the data packet; and
determining to relay the data packet to the third UE based at least in part on the determined reference signal received power being greater than a reference signal received power threshold.

19. The method of claim 18, wherein the message comprising the indication of the failure of the third UE to receive the data packet comprises the reference signal received power threshold, the method further comprising:
determining the reference signal received power threshold based at least in part on the message comprising the indication of the failure of the third UE to receive the data packet.

20. The method of claim 18, further comprising:
adjusting a power control parameter for relaying the data packet to the third UE based at least in part on the determined reference signal received power.

21. The method of claim 16, further comprising:
receiving, from a fourth UE, an additional message comprising an additional indication of an additional failure of the fourth UE to receive an additional data packet, wherein the additional message comprising the additional indication of the additional failure of the fourth UE to receive the additional data packet comprises a resource reservation;
determining to refrain from relaying the additional data packet to the fourth UE in one or more resources indicated by the resource reservation; and
refraining from communicating on one or more resources that overlap with the one or more resources indicated by the resource reservation based at least in part on the resource reservation.

22. The method of claim 16, wherein the data packet is received from the second UE according to a modulation and coding scheme, a spatial multiplexing scheme, and a demodulation reference signal pattern, and wherein relaying the data packet to the third UE comprises:
relaying the data packet to the third UE according to the modulation and coding scheme, the spatial multiplexing scheme, the demodulation reference signal pattern, or a combination thereof.

23. The method of claim 16, wherein the data packet is received from the second UE according to a first modulation and coding scheme, a first spatial multiplexing scheme, and a first demodulation reference signal pattern, and wherein relaying the data packet to the third UE comprises:
  relaying the data packet to the third UE according to a second modulation and coding scheme different from the first modulation and coding scheme, a second spatial multiplexing scheme different from the first spatial multiplexing scheme, a second demodulation reference signal pattern different from the first demodulation reference signal pattern, or a combination thereof.

24. The method of claim 23, wherein the message comprising the indication of the failure of the third UE to receive the data packet comprises an indication of the second modulation and coding scheme, the second spatial multiplexing scheme, the second demodulation reference signal pattern, or a combination thereof, the method further comprising:
  determining the second modulation and coding scheme, the second spatial multiplexing scheme, the second demodulation reference signal pattern, or a combination thereof based at least in part on the message comprising the indication of the failure of the third UE to receive the data packet.

25. The method of claim 16, further comprising:
  determining a distance between the first UE and the third UE; and
  determining to relay the data packet to the third UE based at least in part on the determined distance being less than a distance threshold.

26. The method of claim 16, wherein the message comprising the indication of the failure of the third UE to receive the data packet comprises a source identifier indicating the second UE, a packet identifier indicating the data packet, an exclusion range for a reserved resource, a transmission mode, a redundancy version, a reference signal pattern, or a combination thereof, and wherein relaying the data packet to the third UE comprises:
  relaying the data packet to the third UE based at least in part on the source identifier, the packet identifier, the exclusion range for the reserved resource, the transmission mode, the redundancy version, the reference signal pattern, or a combination thereof.

27. The method of claim 16, wherein the message comprising the indication of the failure of the third UE to receive the data packet comprises a negative acknowledgment message or a request for the data packet or both.

28. A method for wireless communications at a first user equipment (UE), comprising:
  scheduling transmission of a data packet to second UE and third UE in one or more resources via one or more side-links;
  transmitting, directly to the second UE and the third UE via the one or more side-links, control information comprising a resource reservation indicating the one or more resources for receiving the transmission of the data packet from the first UE and comprising an indication enabling the second UE to relay the data packet to the third UE in response to a message from the third UE comprising an indication of a failure of the third UE to receive the data packet directly from the first UE, wherein the message from the third UE comprises the resource reservation; and
  transmitting, directly to the second UE and the third UE on the one or more resources indicated by the resource reservation and via the one or more side-links, the data packet in the one or more resources.

29. The method of claim 28, further comprising:
  receiving, from the second UE, the data packet based at least in part on the message comprising the indication of the failure of the third UE to receive the data packet.

30. An apparatus for wireless communications at a first user equipment (UE), comprising:
  one or more processors; and
  one or more memories coupled to the one or more processors, the one or more memories comprising instructions executable by the one or more processors individually or collectively to cause the apparatus to:
    receive, from a second UE, control information indicating a resource for reception of a transmission of a data packet from the second UE via a first side-link;
    determine a failure of the first UE to receive the data packet directly from the second UE via a first side-link;
    transmit, to at least a third UE via a second side-link, a message comprising an indication of the failure of the first UE to receive the data packet directly from the second UE, wherein the second side-link is different from the first side-link, and wherein the message comprising the indication of the failure of the first UE to receive the data packet comprises a resource reservation and one or more resources indicated by the resource reservation; and
    receive, directly from the third UE different from the second UE on the one or more resources indicated by the resource reservation and via the second side-link, the data packet in response to the message comprising the indication of the failure of the first UE to receive the data packet directly from the second UE.

31. The apparatus of claim 30, wherein, to determine the failure of the first UE to receive the data packet from the second UE, the instructions are further executable by the one or more processors individually or collectively to cause the apparatus to:
  decode the control information, wherein the decoded control information indicates the resource for the transmission of the data packet; and
  fail to decode the data packet in the indicated resource.

32. The apparatus of claim 30, wherein the instructions are further executable by the one or more processors individually or collectively to cause the apparatus to:
  determine a cause of the failure of the first UE to receive the data packet, wherein the cause of the failure is interference, a received signal energy of transmission of the data packet being below a received signal energy threshold, or a combination thereof.

33. An apparatus for wireless communications at a first user equipment (UE), comprising:
  one or more processors; and
  one or more memories coupled to the one or more processors, the one or more memories comprising instructions executable by the one or more processors individually or collectively to cause the apparatus to:
    receive, from a second UE, control information indicating a resource for receiving a transmission of a data packet from the second UE via a first side-link;
    receive the data packet directly from the second UE via a first side-link;
    receive, from a third UE via a second side-link, a message comprising an indication of a failure of the third UE to receive the data packet directly from the second UE, wherein the second side-link is different from the first side-link, and wherein the message comprising the indication of the failure of the third UE to receive the data packet comprises a resource reservation and one or more resources indicated by the resource reservation; and relay the data packet directly to the third UE on the one or more resources indicated by the resource reservation and, via the second side-link, in response to the message comprising the indication of the failure of the third UE to receive the data packet directly from the second UE.

34. The apparatus of claim 33, wherein the instructions are further executable by the one or more processors individually or collectively to cause the apparatus to:

determine the one or more resources indicated by the resource reservation; and determine to relay the data packet to the third UE based at least in part on the first UE supporting transmitting on the one or more resources.

35. The apparatus of claim 33, wherein the instructions are further executable by the one or more processors individually or collectively to cause the apparatus to:

determine a reference signal received power for receiving the message comprising the indication of the failure of the third UE to receive the data packet; and determine to relay the data packet to the third UE based at least in part on the determined reference signal received power being greater than a reference signal received power threshold.

36. An apparatus for wireless communications at a first user equipment (UE), comprising:

one or more processors; and one or more memories coupled to the one or more processors, the one or more memories comprising instructions executable by the one or more processors individually or collectively to cause the apparatus to:

schedule transmission of a data packet to a second UE and a third UE in one or more resources via one or more side-links;

transmit, directly to the second UE and the third UE via the one or more side-links, control information comprising a resource reservation indicating the one or more resources for receiving the transmission of the data packet from the first UE and comprising an indication enabling the second UE to relay the data packet to the third UE in response to a message from the third UE comprising an indication of a failure of the third UE to receive the data packet directly from the first UE, wherein the message from the third UE comprises the resource reservation; and transmit, directly to the second UE and the third UE on the one or more resources indicated by the resource reservation and via the one or more side-links, the data packet in the one or more resources.

37. The apparatus of claim 36, wherein the instructions are further executable by the one or more processors individually or collectively to cause the apparatus to:

receive, from the second UE, the data packet based at least in part on the message comprising the indication of the failure of the third UE to receive the data packet.

38. A non-transitory computer-readable medium storing code for wireless communication at a first user equipment (UE), the code comprising instructions executable by one or more processors to:

receive, from a second UE, control information from indicating a resource for receiving a transmission of a data packet from the second UE via a first side-link;

determine a failure of the first UE to receive the data packet directly from the second UE via the first side-link;

transmit, to at least a third UE via a second side-link, a message comprising an indication of the failure of the first UE to receive the data packet directly from the second UE, wherein the second side-link is different from the first side-link, and wherein the message comprising the indication of the failure of the first UE to receive the data packet comprises a resource reservation and one or more resources indicated by the resource reservation; and receive, directly from the third UE different from the second UE on the one or more resources indicated by the resource reservation and via the second side-link, the data packet in response to the message comprising the indication of the failure of the first UE to receive the data packet directly from the second UE.

39. The non-transitory computer-readable medium of claim 38, wherein, to determine the failure of the first UE to receive the data packet from the second UE, the instructions are executable by the one or more processors to:

decode the control information, wherein the decoded control information indicates the resource for a transmission of the data packet; and fail to decode the data packet in the indicated resource.

40. The non-transitory computer-readable medium of claim 38, wherein the instructions are further executable by the one or more processors to:

determine a cause of the failure of the first UE to receive the data packet, wherein the cause of the failure is interference, a received signal energy of transmission of the data packet being below a received signal energy threshold, or a combination thereof.

41. A non-transitory computer-readable medium storing code for wireless communication at a first user equipment (UE), the code comprising instructions executable by one or more processors to:

receive, from a second UE, control information indicating a resource for receiving a transmission of a data packet from the second UE via a first side-link;

receive the data packet directly from the second UE via the first side-link;

receive, from a third UE via a second side-link, a message comprising an indication of a failure of the third UE to receive the data packet directly from the second UE, wherein the second side-link is different from the first side-link, and wherein the message comprising the indication of the failure of the third UE to receive the data packet comprises a resource reservation and one or more resources indicated by the resource reservation; and relay the data packet directly to the third UE on the one or more resources indicated by the resource reservation and via the second side-link, in response to the message comprising the indication of the failure of the third UE to receive the data packet directly from the second UE.

42. The non-transitory computer-readable medium of claim 41, wherein the instructions further executable by the one or more processors to:

determine the one or more resources indicated by the resource reservation; and determine to relay the data packet to the third UE based at least in part on the first UE supporting transmitting on the one or more resources.

43. The non-transitory computer-readable medium of claim 41, wherein the instructions are further executable by the one or more processors to:
  determine a reference signal received power for receiving the message comprising the indication of the failure of the third UE to receive the data packet; and
  determine to relay the data packet to the third UE based at least in part on the determined reference signal received power being greater than a reference signal received power threshold.

44. A non-transitory computer-readable medium storing code for wireless communication at a first user equipment (UE), the code comprising instructions executable by one or more processors to:
  schedule transmission of a data packet to a second UE and a third UE in one or more resources via one or more side-links;
  transmit, directly to the second UE and the third UE via the one or more side-links, control information comprising a resource reservation indicating the one or more resources for receiving the transmission of the data packet from the first UE and comprising an indication enabling the second UE to relay the data packet to the third UE in response to a message from the third UE comprising an indication of a failure of the third UE to receive the data packet directly from the first UE, wherein the message from the third UE comprises the resource reservation; and
  transmit, directly to the second UE and the third UE on the one or more resources indicated by the resource reservation and via the one or more side-links, the data packet in the one or more resources.

45. The non-transitory computer-readable medium of claim 44, wherein the instructions are further executable by the one or more processors to:
  receive, from the second UE, the data packet based at least in part on the message comprising the indication of the failure of the third UE to receive the data packet.

* * * * *